(12) United States Patent
Iwakura

(10) Patent No.: US 9,348,810 B2
(45) Date of Patent: May 24, 2016

(54) MODEL LEARNING METHOD

(71) Applicant: FUJITSU LIMITED, Kawasaki-shi, Kanagawa (JP)

(72) Inventor: Tomoya Iwakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/312,789

(22) Filed: Jun. 24, 2014

(65) Prior Publication Data
US 2015/0006151 A1    Jan. 1, 2015

(30) Foreign Application Priority Data
Jun. 28, 2013    (JP) .................................. 2013-136647

(51) Int. Cl.
G06F 17/27    (2006.01)
G06F 17/28    (2006.01)

(52) U.S. Cl.
CPC ........ *G06F 17/2775* (2013.01); *G06F 17/2715* (2013.01)

(58) Field of Classification Search
CPC .. G06N 5/025; G06F 17/2775; G06F 17/2715
USPC .......................... 704/9, 236, 244, 275; 706/12
See application file for complete search history.

(56) References Cited

U.S. PATENT DOCUMENTS 8,296,249 B2 * 10/2012 Iwakura .................. G06N 5/025
                                                     706/12
8,370,276 B2 * 2/2013 Iwakura .................. G06N 5/025
                                                     706/12

FOREIGN PATENT DOCUMENTS

JP    2010-033213    2/2010

OTHER PUBLICATIONS

Robert E. Schapire et al., "BoosTexter: A Boosting-based System for Text Categorization", Machine Learning, vol. 39, Issue 2-3, 2000, 34 pages.

Masaaki Nagata, "A Stochastic Japanese Morphological Analyzer Using a Forward-DP Backward-A* N-Best Search Algorithm", Proceedings of the 15th conference on Computational Linguistics, vol. 1 1994, 8 pages.

Robert E. Schapire et al., "Improved Boosting Algorithms Using Confidence-rated Predictions", Machine Learning, vol. 37, Issue 3, 1999, 40 pages.

(Continued)

*Primary Examiner* — Thierry L Pham
(74) *Attorney, Agent, or Firm* — Oblon, McClelland, Maier & Neustadt, L.L.P.

(57) ABSTRACT

A present method includes first updating, based on a weight of each training sample (TS), a first score for each of features, which is a cue when extracting a correct structure from each TS, to calculate a model defined by first scores; performing, for each TS, a processing including identifying a maximum score among second scores, each of which is assigned, by the model, to either of candidate structures other than the correct structure among candidate structures derived from the TS; and first calculating a difference between the identified maximum score and a second score assigned by the model to the correct structure; and second calculating a confidence degree based on an upper limit value of errors, which is defined by the differences; second updating the weight of each TS based on the confidence degree and the differences; and repeating the first updating, performing, second calculating and second updating.

15 Claims, 26 Drawing Sheets

(56) References Cited

OTHER PUBLICATIONS

William W. Cohen et al., "Exploiting Dictionaries in Named Entity Extraction: Combining Semi-Markov Extraction Processes and Data Integration Methods", Proceedings of the 10$^{th}$ ACM SIGKDD International Conference on Knowledge Discovery and Data Mining, 2004, 10 pages.

Sunita Sarawagi et al., "Semi-Markov Conditional Random Fields for Information Extraction", Advances in Neural Information Processing Systems, 2004, 8 pages.

Tomoya Iwakura, "A Boosted Semi-Markov Perceptron", Proceedings of the 17$^{th}$ Conference on Computational Natural Language Learning, 2013, 9 pages.

* cited by examiner

| LABEL | WEIGHT | FEATURE |
|---|---|---|
| +1 | 1/3 | Yamada |
| −1 | 1/3 | sings |
| +1 | 1/3 | Taro |

| RULE | SCORE |
|---|---|
| sings | −0.69954 |
| Yamada | 0.29845 |
| Taro | 0.29845 |

| | 1st WORD | 2nd WORD | 3rd WORD |
|---|---|---|---|
| 1st TRAINING SAMPLE $X_1$ | Yamada | sings | − |
| 2nd TRAINING SAMPLE $X_2$ | Taro | signs | − |
| 3rd TRAINING SAMPLE $X_3$ | Taro | Yamada | signs |

| WEIGHT $w_{1,1}$ FOR 1st TRAINING SAMPLE | 1/3 |
|---|---|
| WEIGHT $w_{1,2}$ FOR 2nd TRAINING SAMPLE | 1/3 |
| WEIGHT $w_{1,3}$ FOR 3rd TRAINING SAMPLE | 1/3 |

| | 1st WORD | 1st LABEL | 2nd WORD | 2nd LABEL | 3rd WORD | 3rd LABEL |
|---|---|---|---|---|---|---|
| 1st CORRECT STRUCTURE $Y_1$ | Yamada | B-NP | sings | B-VP | – | – |
| 2nd CORRECT STRUCTURE $Y_2$ | Taro | B-NP | signs | B-VP | – | – |
| 3rd CORRECT STRUCTURE $Y_3$ | Taro | B-NP | Yamada | I-NP | signs | B-VP |

FIG.10

| CUE | 1st SCORE |
|---|---|
| Taro (NP) | 0 |
| Yamada (NP) | 0 |
| Taro (VP) | 0 |
| Yamada (VP) | 0 |
| sings (VP) | 0 |
| Yamada sings (NP) | 0 |
| Taro Yamada (NP) | 0 |
| ⋮ | ⋮ |

FIG.12

| CUE | 1st SCORE | | |
|---|---|---|---|
| Taro (NP) | 0 | | |
| Yamada (NP) | 1/3 | ← Yamada (NP) | ADD $w_{1,1} = 1/3$ |
| Taro (VP) | 0 | | |
| Yamada (VP) | 0 | | |
| sings (VP) | 1/3 | ← sings (VP) | |
| Yamada sings (NP) | −1/3 | ← Yamada sings (NP) | SUBTRACT $w_{1,1} = 1/3$ |
| Taro Yamada (NP) | 0 | | |
| ⋮ | ⋮ | | |

FIG.14

| WEIGHT $w_{2,1}$ FOR 1st TRAINING SAMPLE | 0.411 |
|---|---|
| WEIGHT $w_{2,2}$ FOR 2nd TRAINING SAMPLE | 0.29449 |
| WEIGHT $w_{2,3}$ FOR 3rd TRAINING SAMPLE | 0.29449 |

FIG.22

| CUE | 1st SCORE |
|---|---|
| Taro (NP) | 0 |
| Yamada (NP) | 0.411 |
| Taro (VP) | 0 |
| Yamada (VP) | 0 |
| sings (VP) | 0.411 |
| Yamada sings (NP) | −0.411 |
| Taro Yamada (NP) | 0 |
| ⋮ | ⋮ |

FIG.24

| CUE | 1st SCORE |
|---|---|
| Taro (NP) | 0.29449 |
| Yamada (NP) | 0.411 |
| Taro (VP) | −0.29449 |
| Yamada (VP) | 0 |
| sings (VP) | 0.411 |
| Yamada sings (NP) | −0.411 |
| Taro Yamada (NP) | 0 |
| ⋮ | ⋮ |

FIG.26

| CUE | 1st SCORE |
|---|---|
| Taro (NP) | 0 |
| Yamada (NP) | 0 |
| Taro (VP) | 0 |
| Yamada (VP) | 0 |
| sings (VP) | 0 |
| Yamada sings (NP) | 0 |
| Taro Yamada (NP) | 0 |
| ⋮ | ⋮ |

FIG.32

MODEL LEARNING METHOD

CROSS-REFERENCE TO RELATED APPLICATIONS

This application is based upon and claims the benefit of priority of the prior Japanese Patent Application No. 2013-136647, filed on Jun. 28, 2013, the entire contents of which are incorporated herein by reference.

FIELD

This invention relates to a machine-learning method.

BACKGROUND

Firstly, as an example of a task for a natural language processing to perform structure prediction, a mapping from a word sequence to a Part-of-Speech (POS) tag sequence, a mapping from the word sequence to a phrase sequence and a mapping from the word sequence to a proper-noun sequence will be explained in sequence.

FIG. 1 illustrates a state of the mapping from the word sequence to the POS tag sequence. A word sequence 11 in this example includes words "Taro" "Yamada" and "signs" in this order. Then, FIG. 1 also illustrates a state that a POS tag such as noun (in the figure, noted by "N") or verb (in the figure, noted by "V") is correlated with the word. In this example, "noun" included in the POS tag sequence 13 is correlated with "Taro" included in the word sequence 11, "noun" included in the POS tag sequence 13 is correlated with "Yamada" included in the word sequence 11, and "verb" included in the POS tag sequence 13 is correlated with "signs" included in the word sequence 11.

FIG. 2 illustrates a state of the mapping from the word sequence to the phrase sequence. The word sequence 11 is the same as that in FIG. 1. Then, FIG. 2 illustrates a state that phrases are extracted from this word sequence, and a noun phrase (in the figure, noted by "NP") or a verb phrase (in the figure, noted by "VP") is correlated to each of the phrases. In this example, a first phrase "Taro Yamada" and a second phrase "signs" in the phrase sequence 21 are extracted, and "noun phrase" is correlated with the first phrase, and "verb phrase" is correlated with the second phrase.

FIG. 3 illustrates a state of the mapping from the word sequence to the proper-noun sequence. The word sequence 11 is the same as that in FIG. 1. Then, FIG. 3 illustrates a state that a person's name (in the figure, noted by "P") or other (in the figure, noted by "O") is correlated with a word or phrase included in this word sequence. In the figure, as depicted in the proper-noun sequence 31, the phrase "Taro Yamada" is determined to be the person's name, and "signs" is determined to be a word other than the person's name.

As an implementation method of these tasks, a supervised learning method has been applied. In this supervised learning method, the aforementioned word sequence and its correct structure (e.g. a label sequence) are given as training data, and by using this training data, the learning is performed so that the word sequence is correctly mapped to the structure. For example, in case of a method in which a classifier is combined, by assigning a label to each word, it becomes possible to determine the final output.

FIG. 4 illustrates a state of a mapping by the classifier. The word sequence 11 is the same as that in FIG. 1. In this example, in the learning, the classifier for assigning a label to a word is used to correlate a label with each word included in the word sequence to be processed.

In this example, 4 labels are used, in other words, "the forefront of the noun phrase" (in the figure, noted by "B-NP"), "a word other than the forefront of the noun phrase" (in the figure, noted by "I-NP"), "the forefront of the verb phrase" (in the figure, noted by "B-VP") and "a word other than the forefront of the verb phrase" (in the figure, noted by "I-VP").

When "the forefront of the noun phrase" is followed by "the forefront of the noun phrase" or "the forefront of the verb phrase", it means that a word corresponding to the foregoing "forefront of the noun phrase" solely corresponds to the noun phrase.

When "the forefront of the noun phrase" is followed by one or plural "words other than the forefront of the noun phrase", it means that a phrase including words from a word corresponding to "the forefront of the noun phrase" to a word corresponding to the extreme rear of "the words other than the forefront of the noun phrase" corresponds to the noun phrase.

When "the forefront of the verb phrase" is followed by "the forefront of the noun phrase" or "the forefront of the verb phrase", it means that a word corresponding to the foregoing "forefront of the verb phrase" solely corresponds to the verb phrase.

When "the forefront of the verb phrase" is followed by one or plural "words other than the forefront of the verb phrase", it means that a phrase including words from a word corresponding to the foregoing "forefront of the verb phrase" to the extreme rear of "words other than the forefront of the verb phrase" corresponds to the verb phrase.

In this example, as depicted by the label sequence 41, "the forefront of the noun phrase" is assigned to "Taro", "the word other than the forefront of the noun phrase" is assigned to "Yamada", and "the forefront of the verb phrase" is assigned to "signs". As a result, as depicted by the phase sequence 43, "Taro Yamada" is determined to be the noun phrase, and "signs" is determined to be the verb phrase.

Moreover, recently, a structured learning method for directly predicting the structure is also used. FIG. 5 illustrates a state of the mapping by the structured learning method. In this example, the learning is performed for a mechanism for directly selecting a correct label sequence among candidates 51 of the label sequences obtained by selectively combining 4 kinds of labels for the respective words. The selection of the label sequence corresponds to selecting a correct path from among paths that connect between the labels for the respective words as illustrated in FIG. 5.

In this example, a label sequence including "the forefront of the noun phrase" for "Taro", "the word other than the forefront of the noun phrase" for "Yamada" and "the forefront of the verb phrase" for "signs" is selected, and as a result, as depicted by the phrase sequence 53, "Taro Yamada" is determined to be the noun phrase, and "signs" is determined to be the verb phrase.

FIG. 6 illustrates a state of the mapping by another structured learning method. The word sequence 11 is the same as that in FIG. 1. This example uses, as a unit, a chunk that is a collection of words. In this method, a mechanism is learned to directly select a correct label sequence from among candidates 61 of the label sequences obtained by selectively combining 4 kinds of labels for the chunks included in the word sequence. In other words, the selection of the label sequence corresponds to selecting a correct path from among paths that connect between labels for the respective chunks as illustrated in FIG. 6. Moreover, assuming that the word sequence becomes one chunk, the label of that chunk may be selected.

In this example, as depicted by the phrase sequence 63, a label sequence including the noun phrase for "Taro Yamada" and the verb phrase for "signs" is selected.

In addition to these learning methods, in order to further improve the determination accuracy, there is an example in which an ensemble learning method is employed. In the boosting method that is one kind of the ensemble learning methods, plural models (also called "rule") is learned to generate a combined model (or learning model) whose accuracy is high by combining those models. A learner for learning plural models is called "a weak leaner", and a model that is learned by that weak leaner are called "a weak hypothesis".

In the boosting method, a weight is set for each training sample included in the training data. Then, adjustment is performed so as to set a lighter weight for an easy training sample for which a correct prediction result is obtained by the weak hypothesis, and so as to set a heavier weight for a difficult training sample for which a correct prediction result is not obtained by the weak hypothesis. By adjusting the weight of each training sample as described above, it is expected to obtain a combined model (or learning model) that is conformable to various kinds of training samples.

According to a certain example that adopts the boosting method for the structure prediction, the classifier for assigning the label as described above is used as the weak leaner.

Patent Document 1: Japanese Laid-open Patent Publication No. 2010-33213

Non-Patent Document

Non-Patent Document 1: Schapire, R. E. and Singer, Y.: "BoosTexter: A boosting-based system for text categorization", *Machine Learning*, Vol. 39(2/3), pp. 135-168 (2000)

Non-Patent Document 2: Nagata, M.: "A Stochastic Japanese Morphological Analyzer Using a Forward-DP Backward-A* N-Best Search Algorithm", *COLING*, pp. 201-207 (1994)

Non-Patent Document 3: Schapire, R. E. and Singer, Y.: "Improved Boosting Algorithms Using Confidence-rated Predictions", *Machine Learning*, Vol. 37, No. 3, pp. 297-336 (1999)

Non-Patent Document 4: Cohen, W. W. and Sarawagi, S.: "Exploiting dictionaries in named entity extraction: combining semi-Markov extraction processes and data integration methods", *Proc. of KDD '04*, pp. 89-98 (2004)

Non-Patent Document 5: Sarawagi, S. and Cohen, W. W.: "Semi-Markov Conditional Random Fields for Information Extraction", *Proc. of NIPS '04* (2004)

However, according to the conventional art, it is difficult to improve the accuracy of the structured learning.

SUMMARY

A model learning method relating to this invention includes: (A) first updating, based on a weight of each training sample, a first score for each of features, which is a cue in case of extracting a correct structure from each training sample, to calculate a model defined by first scores; (B) performing, for each training sample, a processing comprising: identifying a maximum score from among second scores, each of which is assigned, by the model, to either of candidate structures other than the correct structure of the training sample among plural candidate structures that are derived from the training sample; and first calculating a difference between the identified maximum score and a second score that is assigned by the model to the correct structure of the training sample; and (C) second calculating a confidence degree based on an upper limit value of errors, which is defined by the calculated difference of each training sample; (D) second updating, the weight of each training sample based on the confidence degree and the calculated difference of each training sample; and (E) repeating, the first updating, the performing, the second calculating and the second updating.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 10 is a diagram depicting an example of a correct structure;

FIG. 12 is a diagram depicting an example of a structure prediction model in the initial state;

FIG. 14 is a diagram depicting a state of updating the structure prediction model;

FIG. 22 is a diagram depicting example of the weights of the training sample;

FIG. 24 is a diagram depicting a state of updating the structure prediction model;

FIG. 26 is a diagram depicting a state of updating the structure prediction model;

FIG. 32 is a diagram depicting an example of a combined model in the initial state;

DESCRIPTION OF EMBODIMENTS

Firstly, the AdaBoost (See Schapire, R. E. and Singer, Y. "BoosTexter: Aboosting-based system for text categorization", Machine Learning, Vol. 39(2/3), pp. 135-168 (2000)) that is a boosting method used in this application will be explained. An object of the learning is to derive a mapping F as described below from given training samples X to a label set Y:

$$F: \mathcal{X} \to \mathcal{Y}$$

Here, the label is represented by $\{-1, +1\}$.

Figure 7:
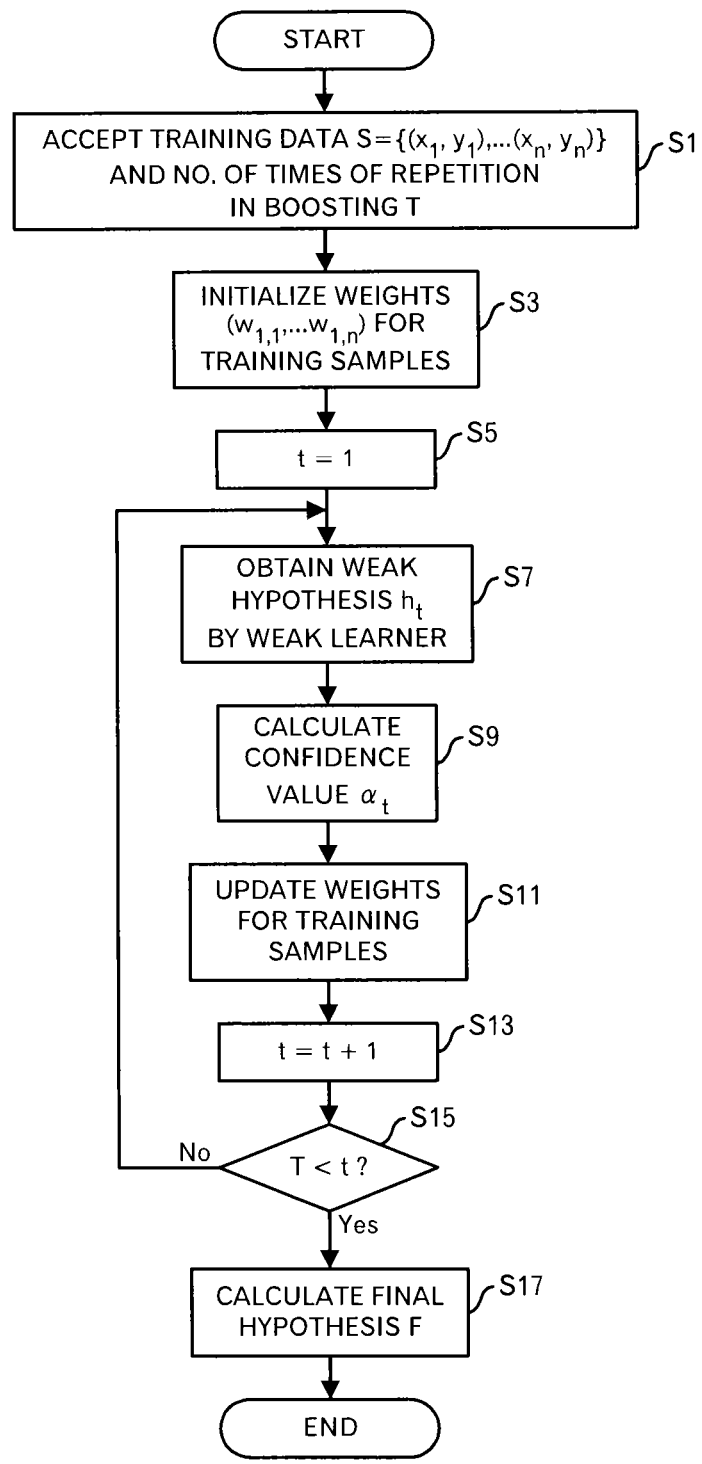
FIG. 7 is a diagram depicting a main processing flow of a conventional art.

FIG. 7 depicts a main processing flow of the AdaBoost. A learning system accepts training data S and the number of times of the repetition in the boosting T (S1). The training data S includes n sets of the training sample and the label, and is represented as $\{(x_1, y_1), \ldots, (x_n, y_n)\}$.

This expression represents a training sample relating to an i-th set.

$$x_i \in \mathcal{X}$$

This expression represents a label relating to the i-th set.

$$y_i \in \mathcal{Y}$$

The number of times of the repetition in the boosting T represents the number of times that the repetition is performed in the boosting.

The learning system initializes weights for the training samples $(w_{1,1}, \ldots, w_{1,n})$ (S3). The weight $w_{1,i}$ is a weight for the training sample $x_i$. An initial value 1/n is set as the weight $w_{1,i}$ of each training sample. In other words, the initial weight for each training sample is equal.

Then, the learning system initializes a counter t to "1" (S5).

The learning system causes the weak learner to compute the weak hypothesis $h_t$ (S7). The weak leaner learns the weak hypothesis $h_t$ from the aforementioned training data S and weights $(w_{1,1}, \ldots, w_{1,n})$ of the training samples. $h_t$ represents the weak hypothesis obtained by the t-th boosting round.

Next, the learning system calculates a confidence degree $\alpha_t$ for the obtained weak hypothesis $h_t$ (S9).

Furthermore, the learning system updates the weights of the training samples according to a following expression (S11):

$$W_{t+1,i} = W_{t,i} \frac{e^{-y_i \alpha_t h_t(x_i)}}{Z_t(\alpha_t)} \quad (1)$$

$h_t(x_i)$ in this expression is a classification result by $h_t$ for the training sample $x_i$, and "e" is Napier's constant. Moreover, a denominator of the expression (1) is represented as follows:

$$Z_t(\alpha_t) = \sum_{i=1}^{n} W_{t,i} e^{-y_i \alpha_t h_t(x_i)} \quad (2)$$

The expression (2) represents a variable to realize a following normalization:

$$\sum_{i=1}^{n} W_{t+1,i} = 1$$

The learning system adds "1" to the counter t (S13), and determines whether or not the value of the counter t exceeds the number of times of the repetition in the boosting T (S15). When it is determined that the value of the counter t does not exceed the number of times of the repetition in the boosting T, the processing returns to S7, and the learning system repeats the aforementioned series of processes.

When it is determined that the value of the counter t exceeds the number of times of the repetition in the boosting T, the learning system computes the final hypothesis F (S17). The learning system computes the final hypothesis F by combining T kinds of weak hypotheses, which are obtained by the aforementioned loop processing.

$$F(x) = \text{sign}\left(\sum_{t=1}^{T} \alpha_t h_t(x)\right)$$

"sign" in this expression is a function to return "+1" when an inputted value is positive and return "-1" when the inputted value is other than "positive".

Figures 8, 9, 11:
FIG. 8 is a diagram depicting examples of training data and rules in the conventional art.
FIG. 9 is a diagram depicting an example of a training sample.
FIG. 11 is a diagram depicting examples of weights of the training sample in an initial state.

FIG. 8 illustrates examples of the training data and rules to be learned in the AdaBoost. An upper table in FIG. 8 is an example of the training data given to the AdaBoost. In this example, the label "+1" represents that it is a portion of the noun phrase, and the label "-1" represents that it is other than the noun phrase. Here, the feature is a candidate of the rule. The first record represents that the weight "⅓" is given to that the feature "Yamada" is a portion of the noun phrase. The second record represents that the weight "⅓" is given to that the feature "sings" is other than the noun phrase. The third record represents that the weight "⅓" is given to that the feature "Taro" is a portion of the noun phrase. Rules represented in a lower table in FIG. 8 are learned from such training data. Here, the positive value means that it is the noun phrase, and the negative value means that it is not the noun phrase.

In the AdaBoost, it is proved that the final hypothesis F including T kinds of weak hypotheses has the upper bound of the training error as expressed below:

$$\frac{1}{n}\sum_{i=1}^{n}[[F(x_i) \neq y_i]] \leq \prod_{t=1}^{T} Z_t(\alpha_t) \quad (3)$$

[[π]] represents "1" in case where a certain proposition π stands up, and "0" in case where the certain proposition π does not stand up.

When the confidence degree $\alpha_t$ that satisfies a condition that is represented by a following expression is selected for $h_t$ in each boosting round t, it is derived that the learning by the AdaBoost converges.

$$Z_t(\alpha_t) < 1$$

[Specific Contents in an Embodiment]

In this embodiment, two kinds of scores are used, which include a score to define a structure prediction model and a score to evaluate the structure. In the following, the score to define the structure prediction model is called "a first score" and the score to evaluate the structure is called "a second score", and they are distinguished.

In the aforementioned boosting method, it is assumed that the positive example and negative example are given, however, the negative example is not explicitly given in the structured learning method. Therefore, the structured learning method as it is may not be applied to the Boosting method.

Then, in this embodiment, a difference between a second score for the correct structure for the training samples and a highest second score for structures other than the correct structure is used. Furthermore, the weights of the training samples are updated based on the upper bound of the training error, which is defined by the aforementioned difference in the second score. Specifically, when the second score for the correct structure is lower than the highest second score, it means that the structure is inappropriate. Therefore, the weight of the training sample is increased. When the second score for the correct structure is equal to or higher than the highest second score, it means that the structure is appropriate. Therefore, the weight of the training sample is decreased.

In the following, an outline of the processing will be explained. Firstly, the training data will be described. FIG. 9 illustrates examples of the training samples included in the training data. The training samples in this example are words sequence. Here, in order to simplify the explanation, an example including three words is depicted, however, the number of words may be greater.

Moreover, in order to simplify the explanation, the number of training samples is three, however, when the actual learning is performed, more training samples are prepared.

The first training sample $X_1$ is a word sequence that includes a first word "Yamada" and a second word "signs". The second training sample $X_2$ is a word sequence that includes a first word "Taro" and a second word "signs". The third training sample $X_3$ is a word sequence that includes a first word "Taro", a second word "Yamada" and a third word "signs".

Figure 6:
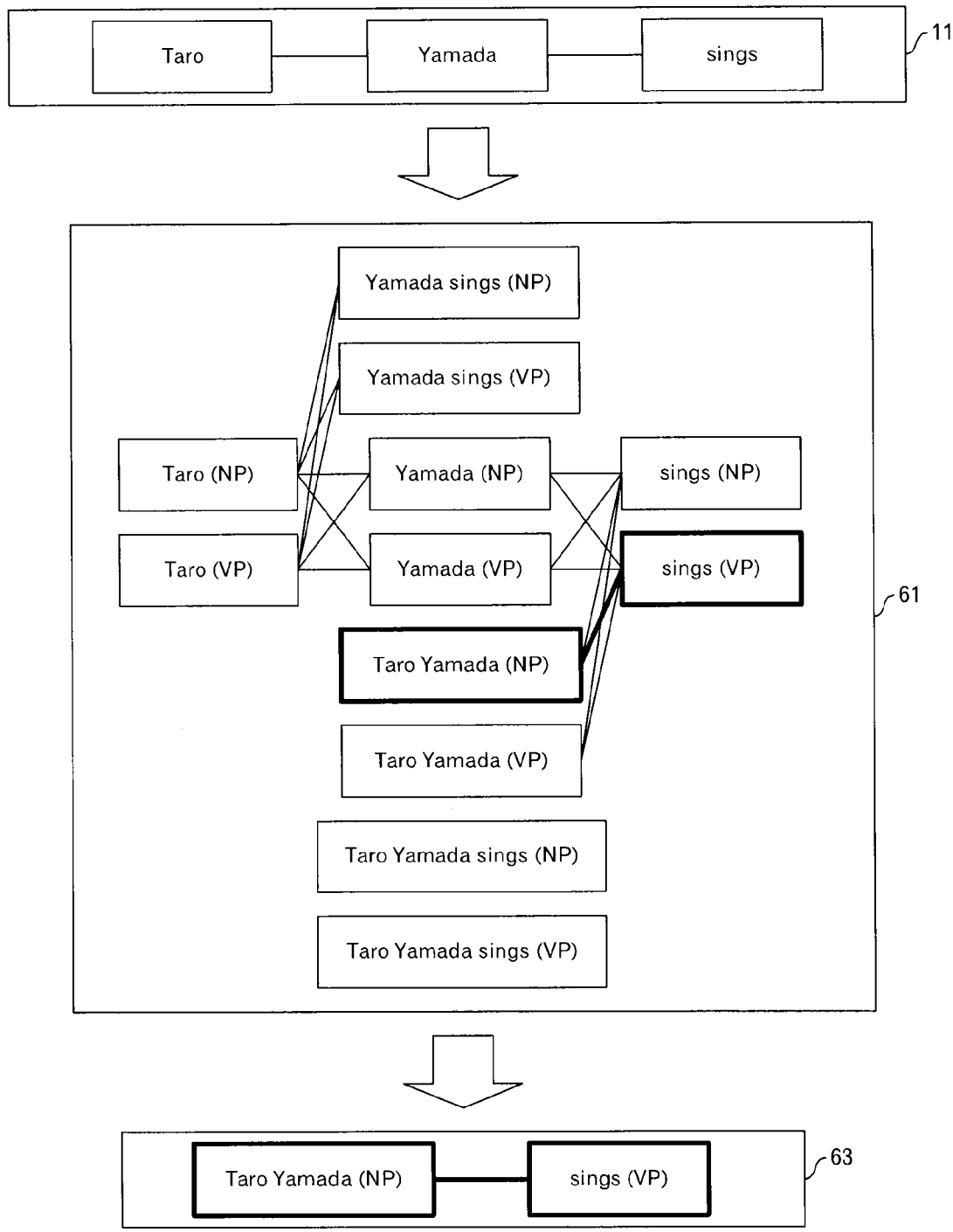
FIG. 6 is a diagram depicting a state of mapping by the structured learning method.

The training data also has a correct structure for the word sequence that is the training sample. In this example, as illustrated in FIG. 6, the correct structure is a sequence of combinations of a chunk and a label for that chunk.

Figure 1:
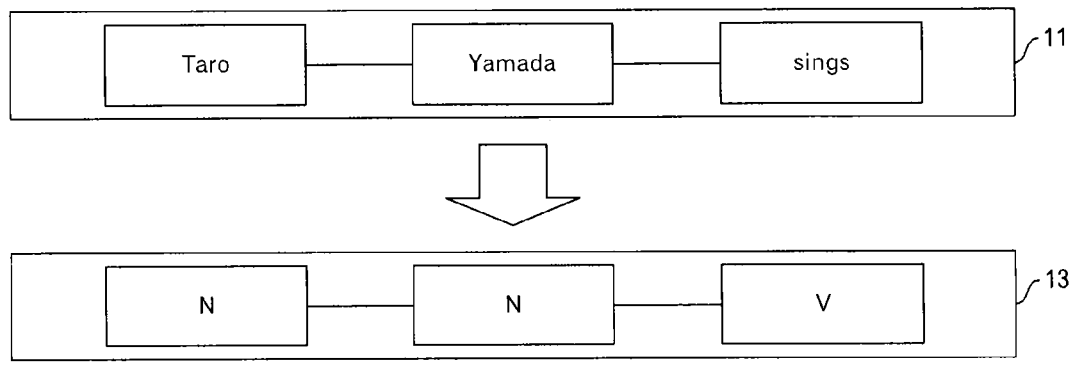
FIG. 1 is a diagram depicting a state of mapping from a word sequence to a word type sequence.
Figure 2:
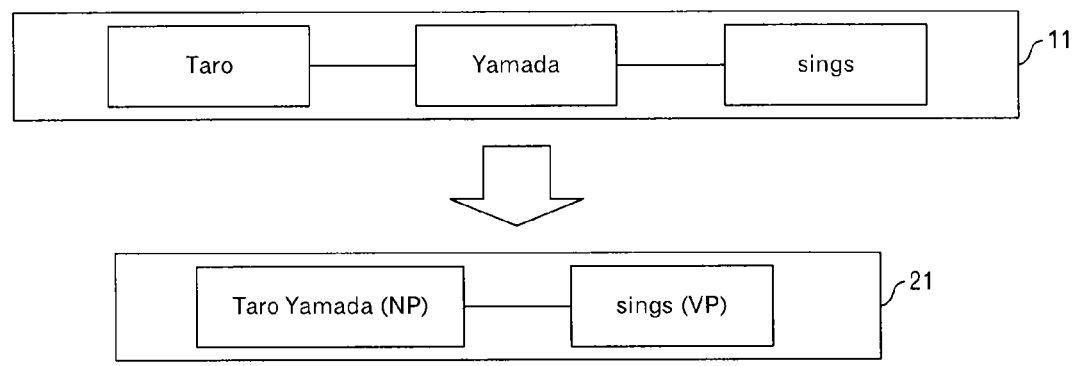
FIG. 2 is a diagram depicting a state of mapping from a word sequence to a phrase sequence.
Figure 3:
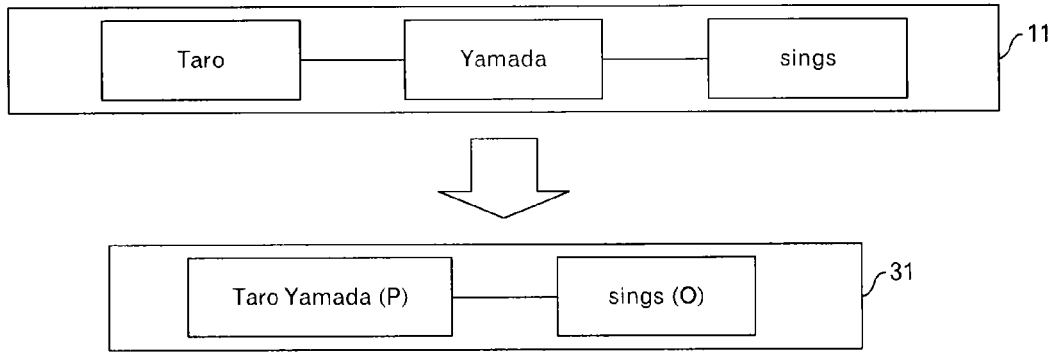
FIG. 3 is a diagram depicting a state of mapping from a word sequence to a proper-noun sequence.
Figure 4:
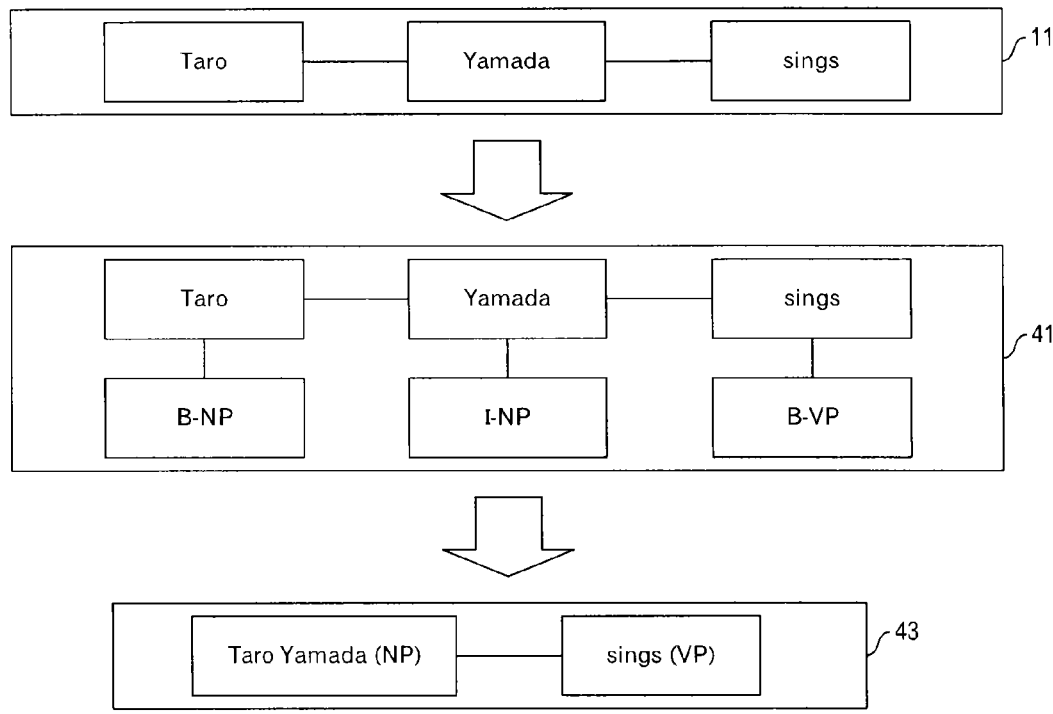
FIG. 4 is a diagram depicting a state of mapping by a classifier.
Figure 5:
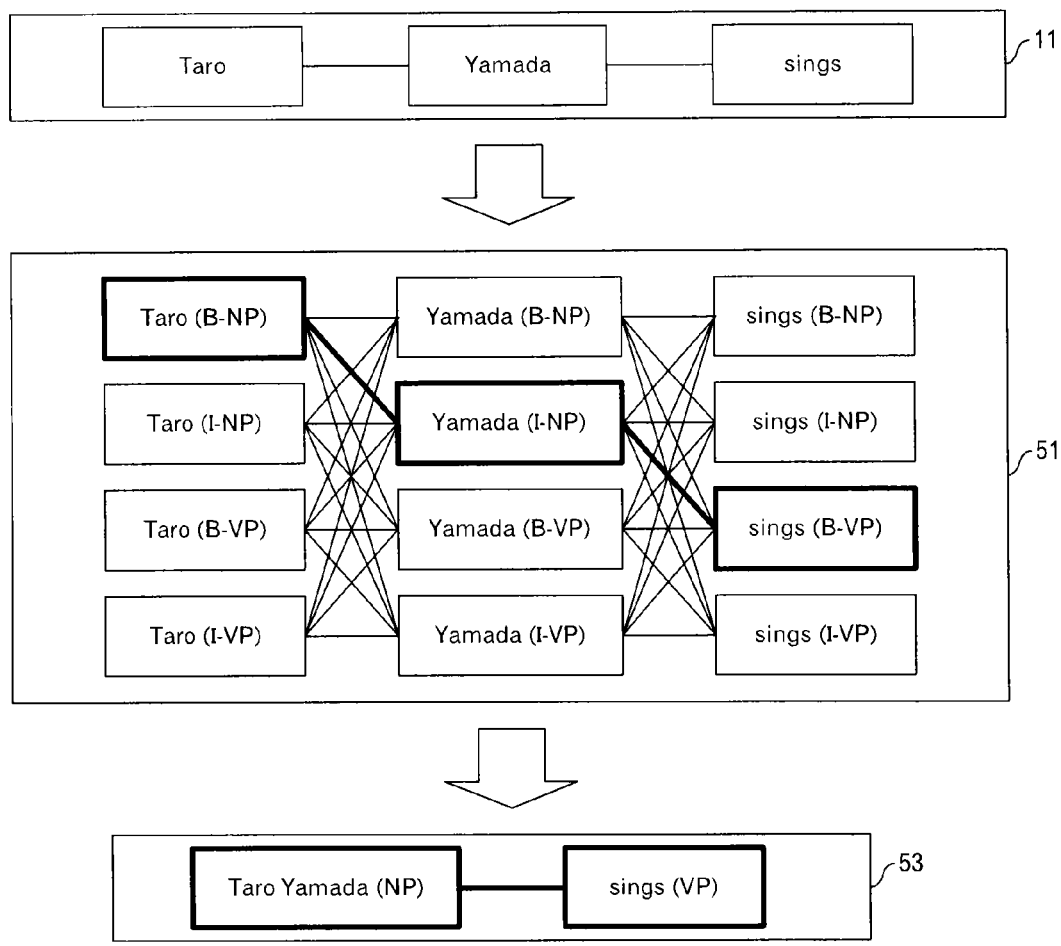
FIG. 5 is a diagram depicting a state of mapping by a structured learning method.

In examples of the correct structures illustrated in FIG. 10, chunks and phrase types (or phrase class) are identified by using 4 kinds of labels "the forefront of the noun phrase" (B-NP), "a word other than the forefront of the noun phrase" (I-NP), "the forefront of the verb phrase" (B-VP) and "a word other than the forefront of the verb phrase" (I-VP), which were explained in FIG. 4. However, any format of the structure other than that in FIG. 10 to identify the combination of the chunk and phrase type may be employed.

In this embodiment, a weight is assigned to each training sample. FIG. 11 illustrates examples of the training samples in the initial state. In the initial state, the total of the weights is "1", and an equal value is set to each of the weights. In this example, the number of training samples is "3", therefore, ⅓ is used for each of the weights.

Next, a structure prediction model relating to this embodiment will be explained. The structured learning method described in Cohen, W. W. and Sarawagi S., "Exploiting dictionaries in named entity extraction: combining semi-Markov extraction processes and data integration methods", Proc. of KDD'04, pp. 89-98 (2004) or Sarawagi, S. and Cohen, W. W., "Semi-Markov Conditional Random Fields for Information Extraction", Proc. of NIPS'04 (2004) may be employed. Here, an example in which the boosting is applied to the structured learning method in the aforementioned former paper will be explained. FIG. 12 illustrates an example of the structure prediction model in the initial state. The structure prediction model has a first score corresponding to each cue to predict the correct structure. The cue in this example corresponds to a feature. In the initial state, an initial value "0" is set as each of the first scores.

In this example, the first record in FIG. 12 represents that "0" is set as the first score for the cue that the label of the chunk "Taro" is the noun phrase (NP). In this example, the second record in FIG. 12 represents that "0" is set as the first score for the cue that the label of the chunk "Yamada" is the noun phrase (NP). In this example, the third record in FIG. 12 represents that "0" is set as the first score for the cue that the label of the chunk "Taro" is the verb phrase (VP). In this example, the fourth record in FIG. 12 represents that "0" is set as the first score for the cue that the label of the chunk "Yamada" is the verb phrase (VP). In this example, the fifth record in FIG. 12 represents that "0" is set as the first score for the cue that the label of the chunk "signs" is the verb phrase (VP). In this example, the sixth record in FIG. 12 represents that "0" is set as the first score for the cue that the label of the chunk "Yamada signs" is the noun phrase (NP). In this example, the seventh record in FIG. 12 represents that "0" is set as the first score for the cue that the label of the chunk "Taro Yamada" is the noun phrase (NP). A condition to identify the cue is not limited to this example. For example, a condition for a prior word or subsequent word of that chunk may be included.

Figure 13:
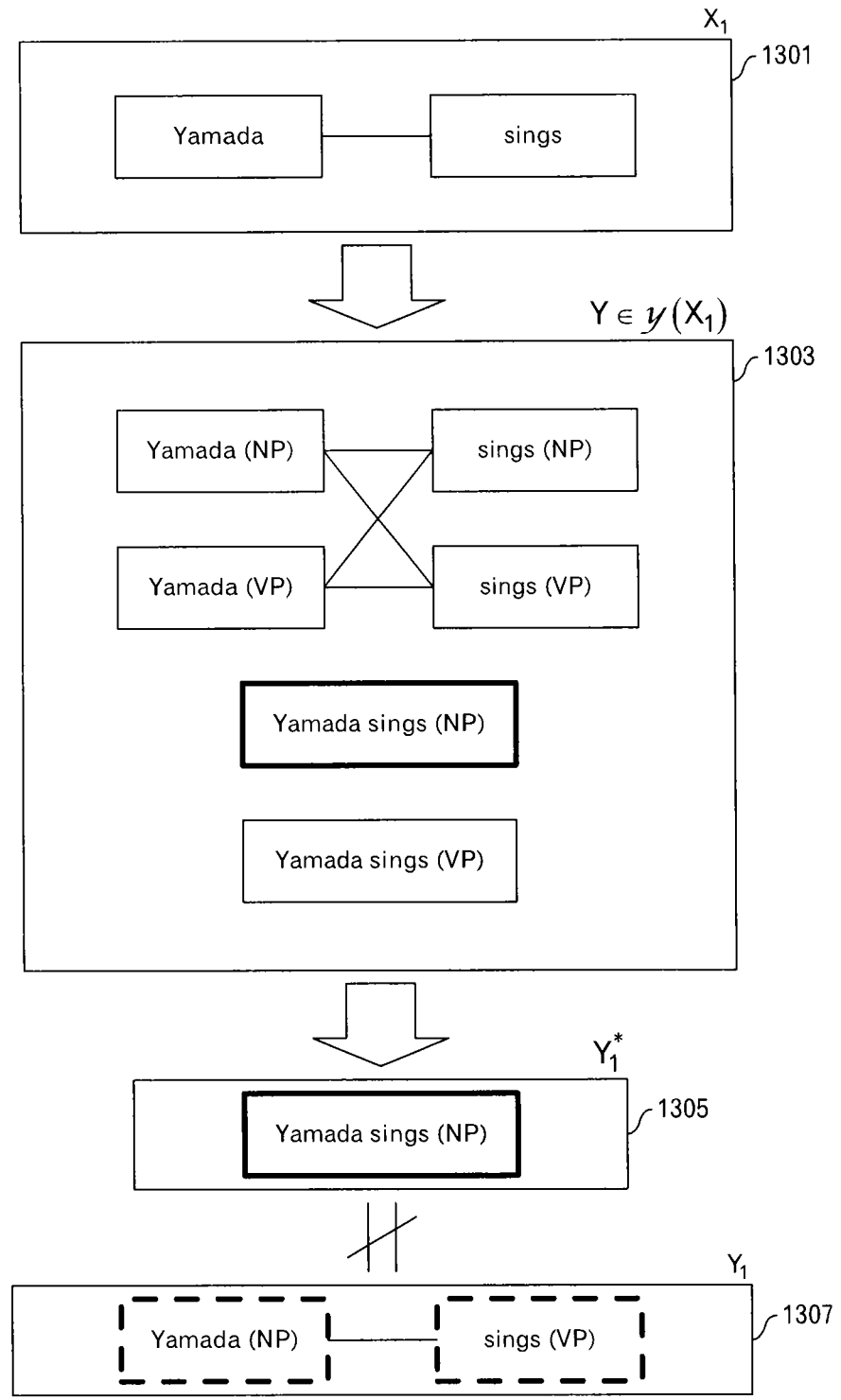
FIG. 13 is a diagram depicting a state of the structured learning.

FIG. 13 illustrates a state of the structured learning. This figure illustrates a state that a structure $Y^*_1$ 1305 having the greatest second score is extracted from candidate structures Y 1303 for the word sequence 1301 of the first training sample $X_1$ according to the structure prediction model illustrated in FIG. 12. In the structure prediction model illustrated in FIG. 12, all of the first scores are "0". Therefore, the second score in each candidate structure Y equally becomes "0". In such a case, any of the candidate structures Y can be extracted, however, in this example, a structure Y that is a combination of the chunk "Yamada signs" and its label "the name phrase (NP)" is selected.

The correct structure $Y_1$ 1307 of the first training sample $X_1$ corresponds to column for a combination of the first chunk "Yamada" and its label "the noun phrase (NP)" and a combination of the second chunk "signs" and its label "the verb phrase (VP)". Therefore, it is determined that the maximum-score structure $Y^*_1$ 1305 that was extracted here is not identical to the correct structure $Y_1$ 1307.

In this figure, the combination of the chunk and its label, which are included in the maximum-score structure $Y^*_1$ 1305 is surrounded by a thick solid line, and the combination of the chunk and its label, which are included in the correct structure $Y_1$ 1307 is surrounded by a thick dotted line.

FIG. 14 illustrates a state that the structure prediction model is updated based on the determination result illustrated in FIG. 13. In this embodiment, when it is determined that the maximum-score structure is not identical to the correct structure, the weight of the training sample is subtracted from the first score of each cue for the maximum-score structure. Furthermore, the weight of the training sample is added to the first score of each cue for the correct structure.

The added value and subtracted value are called "a learning rate". In other words, by using the weight of the training sample as the learning rate, the subtraction from the first score of each cue for the maximum-score structure is performed and the addition to the first score of each cue for the correct structure is performed.

Because the combination of the chunk "Yamada signs" and its label "the noun phrase (NP)", which are included in the maximum-score structure $Y^*_1$ 1305 is identical to the cue of the sixth record in the structure prediction model, the weight is subtracted from the first score of the sixth record. Thus, "⅓", which corresponds to the weight $W_{1,1}$ of the first training sample illustrated in FIG. 11, is subtracted from the first score of the sixth record.

Furthermore, because the combination of the first chunk "Yamada" and its label "the noun phrase (NP)", which are included in the correct structure $Y_1$1307, is identical to the cue of the second record in the structure prediction model, the weight is added to the first score of the second record. Similarly, because the combination of the second chunk "signs" and its label "the verb phrase (VP)", which are included in the correct structure $Y_1$ 1307, is identical to the cue of the fifth record in the structure prediction model, the weight is added to the first score of the fifth record. At this time, as for each case, "⅓" that corresponds to the weight $W_{1,1}$ of the first training sample illustrated in FIG. 11, is added. The first structured learning for the first training sample is finished with this processing.

Figure 15:
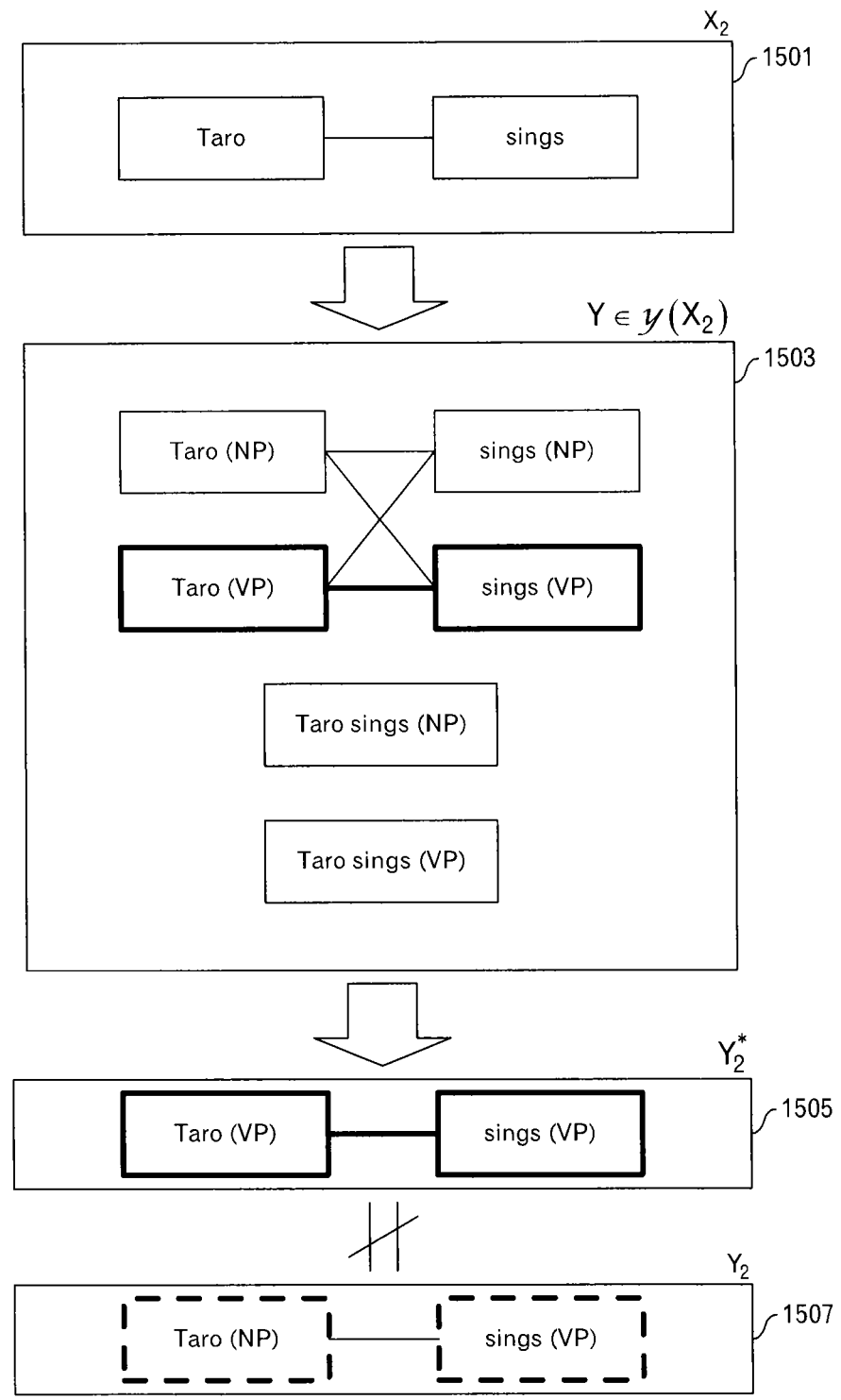
FIG. 15 is a diagram depicting a state of the structured learning.

Next, FIG. 15 illustrates a state of the first structured learning for the second training sample. This figure illustrates a state that the structure $Y^*_2$ 1505 whose second score is greatest is extracted from the candidate structures $Y$ 1503 for the word sequence 1501 of the second training sample $X_2$ according to the structure prediction model illustrated in FIG. 14. Here, a column for a combination of the chunk "Taro" and its label "the verb phrase (VP)" and a combination of the chunk "signs" and its label "the verb phrase (VP)" is selected.

As for the second training sample $X_2$, it is determined that the maximum-score structure $Y^*_2$ 1505, which is extracted here, is not identical to the correct structure $Y_2$ 1507.

Also in FIG. 15, a combination of the chunk and its label, which are included in the maximum-score structure $Y^*_2$1505, is surrounded by a thick solid line, and a combination of the chunk and its label, which are included in the correct structure $Y_2$ 1507, is surrounded by a thick dotted line.

Figure 16:
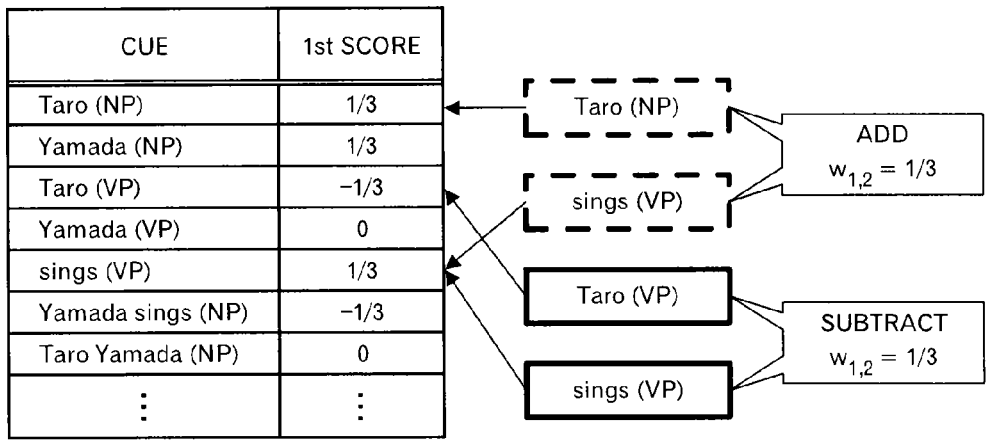
FIG. 16 is a diagram depicting a state of updating the structure prediction model.

FIG. 16 illustrates a state that the structure prediction model is updated based on the determination result illustrated in FIG. 15. Because the combination of the chunk "Taro" and its label "the verb phrase (VP)", which are included in the maximum-score structure $Y^*_2$ 1505, is identical to the cue of the third record in the structure prediction model, the weight is subtracted from the first score of the third record. Similarly, because the combination of the chunk "signs" and its label "the verb phrase (VP)", which are included in the maximum-score structure $Y^*_2$ 1505, is identical to the cue of the fifth record in the structure prediction model, the weight is subtracted from the first score of the fifth record. At this time, as for each case, "⅓", which corresponds to the weight $W_{1,2}$ of the second training sample illustrated in FIG. 11, is subtracted from the first score.

Furthermore, because a combination of the first chunk "Taro" and its label "the noun phrase (NP)", which are included in the correct structure $Y_2$ 1507, is identical to the cue of the first record in the structure prediction model, the weight is added to the first score of the first record. Similarly, because a combination of the second chunk "signs" and its label "the verb phrase (VP)", which are included in the correct structure $Y_2$ 1507, is identical to the cue of the fifth record in the structure prediction model, the weight is added to the first score of the fifth record. At this time, as for each case, "⅓", which corresponds to the weight $W_{1,2}$ of the first training sample illustrated in FIG. 11, is added to the first score. The first score of the fifth record does not change as a result, because both of the addition and subtraction are performed. Then, the first structured learning for the second training sample is finished.

Figure 17:
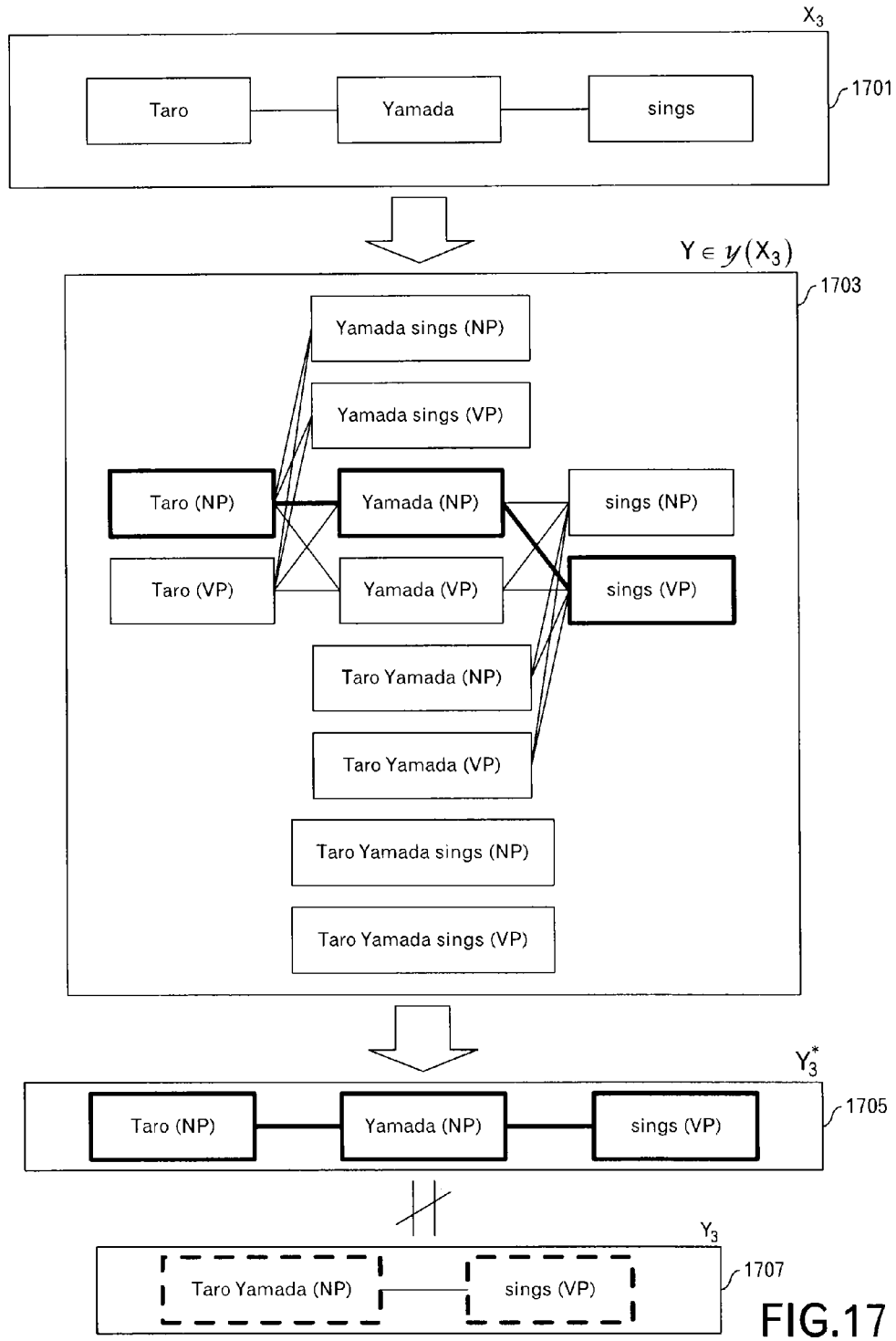
FIG. 17 is a diagram depicting a state of the structured learning.

Next, FIG. 17 illustrates a state of the first structured learning for the third training sample. FIG. 17 illustrates a state that the structure $Y^*_3$ 1705 whose second score is greatest is extracted from the candidate structures $Y$ 1703 for the word sequence 1701 of the third training sample $X_3$ according to the structure prediction model illustrated in FIG. 16. Here, column for a combination of the chunk "Taro" and its label "the noun phrase (NP)" and a combination of the chunk "Yamada" and its label "the noun phrase (NP)" and a combination of the chunk "signs" and its label "the verb phrase (VP)" are selected.

Because the correct structure $Y_3$ 1707 of the third training sample $X_3$ corresponds to columns of the combination of the first chunk "Taro Yamada" and its label "the noun phrase (NP)" and the combination of the second chunk "signs" and its label "the verbphase (VP)", it is determined that the maximum-score structure $Y^*_3$1705, which is extracted here, is not identical to the correct structure $Y_3$ 1707.

Also in FIG. 17, a combination of the chunk and its label, which are included in the maximum-score structure $Y^*_3$1705, is surrounded by a thick solid line, and a combination of the chunk and its label, which are included in the correct structure $Y_3$ 1707, is surrounded by a thick dotted line.

Figure 18:
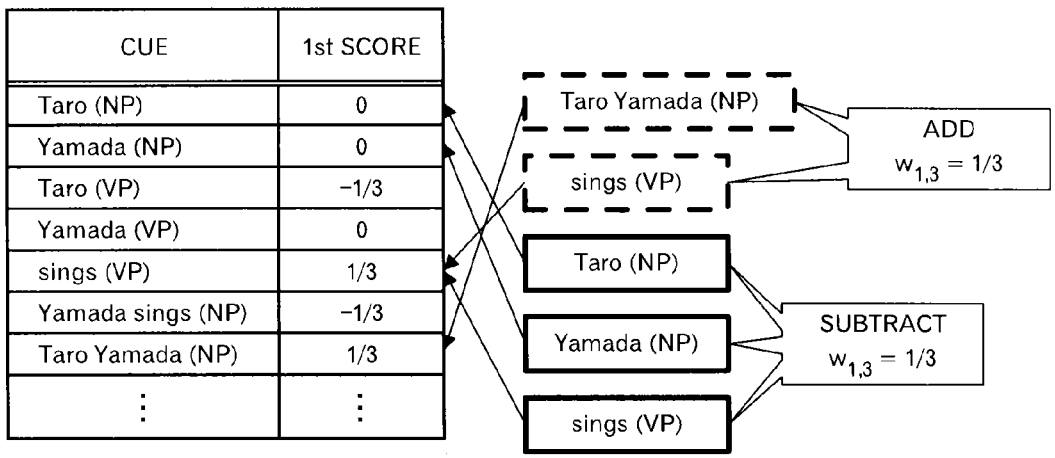
FIG. 18 is a diagram depicting a state of updating the structure prediction model.

FIG. 18 illustrates a state that the structure prediction model is updated based on the determination result in FIG. 17. Because the combination of the chunk "Taro" and its label "the noun phrase (NP)", which are included in the maximum-score structure $Y^*_3$ 1705, is identical to the cue of the first record in the structure prediction model, the weight is subtracted from the first score of the first record. Similarly, because the combination of the chunk "Yamada" and its label "the noun phrase (NP)", which are included in the maximum-score structure $Y^*_3$ 1705, is identical to the cue of the second record in the structure prediction model, the weight is subtracted from the first score of the second record. Similarly, because the combination of the chunk "signs" and its label "the verb phrase (VP)", which are included in the maximum-score structure $Y^*_3$1705, is identical to the cue of the fifth record in the structure prediction model, the weight is subtracted from the first score of the fifth record. At this time, as for each case, "⅓", which corresponds to the weight $W_{1,3}$ of the third training sample illustrated in FIG. 11, is subtracted from the first score.

Furthermore, because the combination of the first chunk "Taro Yamada" and its label "the noun phrase (NP)", which are included in the correct structure $Y_3$ 1707, is identical to the cue of the seventh record in the structure prediction model, the weight is added to the first score of the seventh record. Similarly, because the combination of the second chunk "signs" and its label "the verb phrase (VP)", which are included in the correct structure $Y_3$ 1707, is identical to the cue of the fifth record in the structure prediction model, the weight is added to the first score of the fifth record. At this time, as for each case, "⅓", which corresponds to the weight $W_{1,3}$ of the third training sample illustrated in FIG. 11 is added to the first score. The first score of the fifth record does not change as a result, because both of the subtraction and addition are performed. Then, the first structured learning for the third training sample is finished.

Typically, the aforementioned structured learning is repeated plural times, however, in order to simplify the explanation, the structured learning is temporarily terminated here, without performing the repetition.

When the structure prediction model is obtained as described above, the confidence degree for the structure prediction model is then calculated. In this embodiment, the confidence degree is calculated based on a difference between the maximum score of the second scores for the candidate structures except the correct structure and a correct score that is the second score for the correct structure. The second score is calculated based on the structure prediction model at that time.

Figure 19:
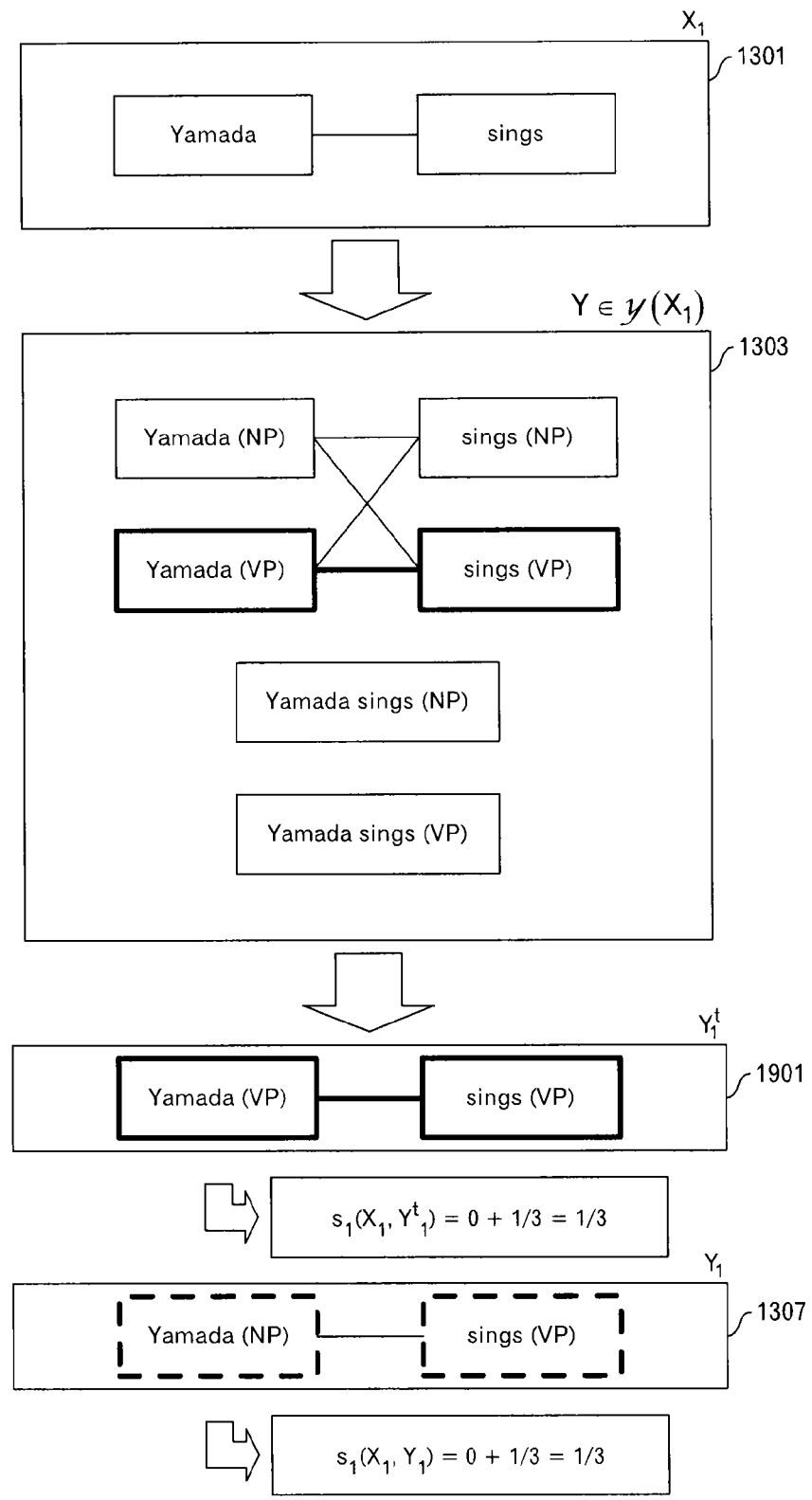
FIG. 19 is a diagram depicting a state of calculating a second score.

FIG. 19 illustrates a state of the first calculation of the second score for the first training sample. FIG. 19 illustrates a state that the structure $Y^t_1$ 1901 having the greatest second score (except the correct structure $Y_1$ 1307) is extracted from the candidate structures Y 1303 for the word sequence 1301 of the first training sample $X_1$ according to the structure prediction model illustrated in FIG. 18. Here, columns for a combination of the chunk "Yamada" and its label "the verb phrase (VP)" and a combination of the chunk "signs" and its label "the verb phrase (VP)" are selected.

The second score $s_1 (X_1, Y^t_1)$ for the structure $Y^t_1$ 1901 having the greatest second score is the total of the score for the combination of the chunk "Yamada" and its label "the verb phrase (VP)" and the score for the combination of the chunk "signs" and its label "the verb phrase (VP)". The first score set in the fourth record that represents the cue, which is identical to the combination of the chunk "Yamada" and its label "the verb phrase (VP)", in the structure prediction model illustrated in FIG. 18, is used for the calculation of the score for that combination. In other words, "0" is obtained. The first score set in the fifth record that represents the cue, which is identical to the combination of the chunk "signs" and its label "the verb phrase (VP)", in the structure prediction model illustrated in FIG. 18, is used for the calculation of the score for that combination. In other words, "⅓" is obtained. Therefore, the maximum score $s_1 (X_1, Y^t_1)$ for the structure $Y^t_1$ 1901 having the greatest second score is "⅓".

Furthermore, the correct score that is the second score for the correct structure $Y_1$ 1307 is also calculated. The second score $s_1 (X_1, Y_1)$ for the correct structure $Y_1$ 1307 is the total of the score for the combination of the first chunk "Yamada" and its label "the noun phrase (NP)" and the score for the combination of the second chunk "signs" and its label "the verb phrase (VP)". The first score set in the second record that represents the cue, which is identical to the combination of the first chunk "Yamada" and its label "the noun phrase (NP)", in the structure prediction model illustrated in FIG. 18, is used for the calculation of the score for that combination. In other words, "0" is obtained. The first score set in the fifth record that represents the cue, which is identical to the combination of the second chunk "signs" and its label "the verb phrase (VP)", in the structure prediction model illustrated in FIG. 18, is used for the calculation of the score for that combination. In other words, "⅓" is obtained. Therefore, the correct score $s_1 (X_1, Y_1)$ that is the second score of the correct structure $Y_1$ 1307 is "⅓".

Therefore, the difference between the correct score and the maximum score is "0" for the first training sample $X_1$.

Figure 20:
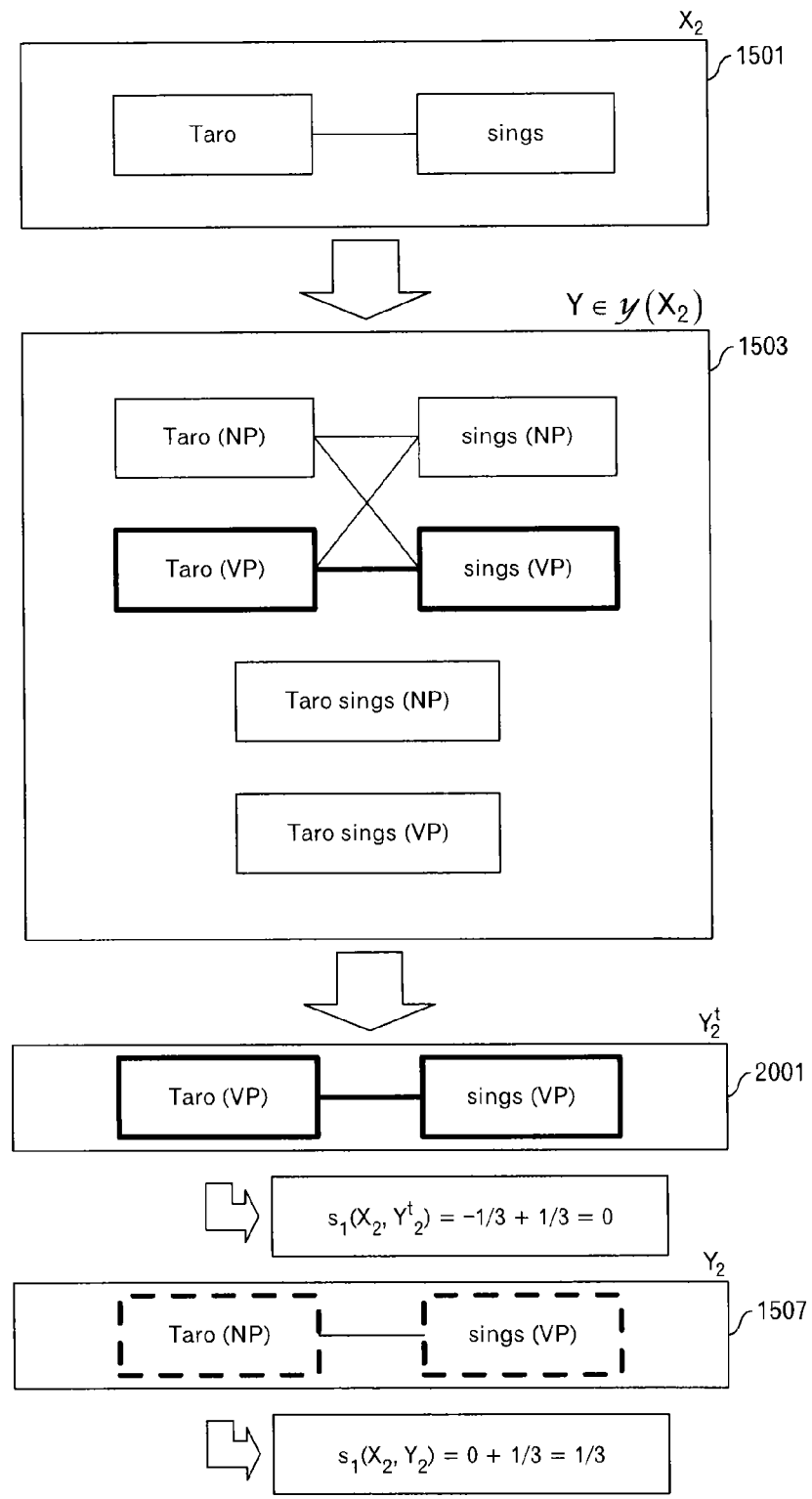
FIG. 20 is a diagram depicting a state of calculating the second score.

FIG. 20 illustrates a state of the first calculation of the second score for the second training sample. FIG. 20 represents a state that the structure $Y^t_2$ 2001 (except the correct structure $Y_2$ 1507) having the maximum second score is extracted from the candidate structures Y 1503 for the word sequence 1501 of the second training sample $X_2$ in accordance with the structure prediction model illustrated in FIG. 18. Here, columns for a combination of the chunk "Taro" and its label "the verb phrase (VP)" and a combination of the chunk "signs" and its label "the verb phrase (VP)" are selected.

The second score $s_1 (X_2, Y^t_2)$ for the structure $Y^t_2$ 2001 having the greatest second score is the total of a score for the combination of the chunk "Taro" and its label "the verb phrase (VP)" and a score for the combination of the chunk "signs" and its label "the verb phrase (VP)". The first score set in the third record that represents the cue, which is identical to the combination of the chunk "Taro" and its label "the verb phrase (VP)", in the structure prediction model illustrated in FIG. 18, is used for the calculation of the score for that combination. In other words, "−⅓" is obtained. The first score set in the fifth record that represents the cue, which is identical to the combination of the chunk "signs" and its label "the verb phrase (VP)", in the structure prediction model illustrated in FIG. 18, is used for the calculation of the score for that combination. In other words, "⅓" is obtained. Therefore, the maximum score $s_1 (X_2, Y^t_2)$ for the structure $Y^t_2$ 2001 having the maximum second score is "0".

Furthermore, the correct score that is the second score of the correct structure $Y_2$ 1507 is also calculated. The second score $s_1 (X_2, Y_2)$ for the correct structure $Y_2$ 1507 is the total of the score for the combination of the first chunk "Taro" and its label "the noun phrase (NP)" and the score for the combination of the second chunk "signs" and its label "the verb phrase (VP)". The first score set in the first record that represents the cue, which is identical to the combination of the first chunk "Taro" and its label "the noun phrase (NP)", in the structure prediction model illustrated in FIG. 18 is used for the calculation of the score for that combination. In other words, "⅓" is obtained. The first score set in the fifth record that represents the cue, which is identical to the combination of the second chunk "signs" and its label "the verb phrase (VP)", in the structure prediction model illustrated in FIG. 18 is used for the calculation of the score for that combination. In other words, "⅓" is obtained. Therefore, the correct score $s_1 (X_2, Y_2)$ that is the second score of the correct structure $Y_2$ 1507 is "⅓".

Therefore, as for the second training sample $X_2$, the difference between the correct score and the maximum score is "⅓".

Figure 21:
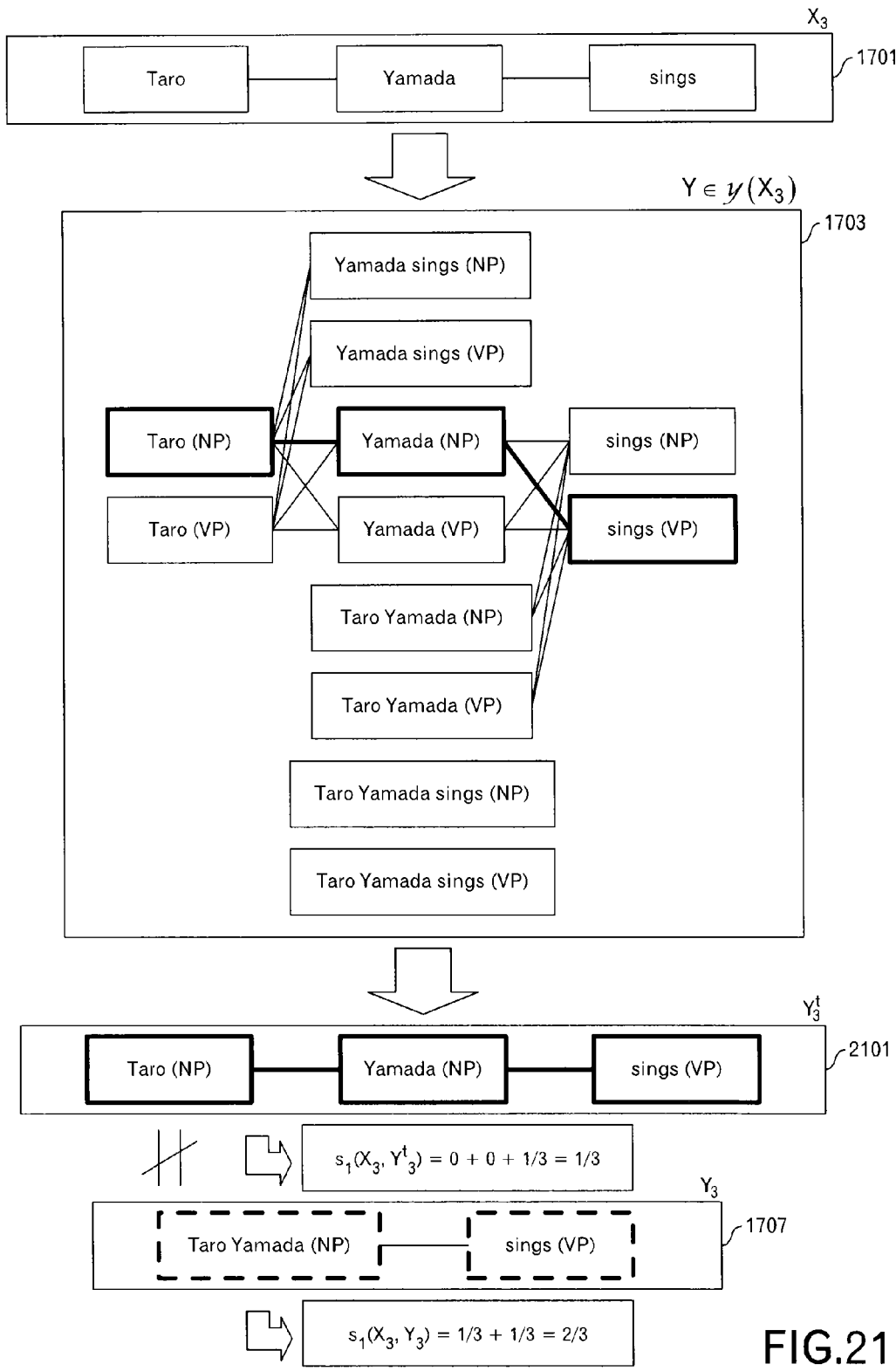
FIG. 21 is a diagram depicting a state of calculating the second score.

FIG. 21 illustrates a state of the first calculation of the score for the third training sample. FIG. 21 illustrates a state that the structure $Y^t_3$ 2101 having the greatest second score (except the correct structure $Y_3$ 1707) is extracted from the candidate structures Y 1703 for the word sequence 1701 of the third training structure $X_3$ according to the structure prediction model illustrated in FIG. 18. Here, columns for a combination of the chunk "Taro" and its label "the noun phrase (NP)", a combination of the chunk "Yamada" and its label "the noun phrase (NP)" and a combination of the chunk "signs" and its label "the verb phrase (VP)" are selected.

The second score $s_1$ ($X_3$, $Y^t_3$) for the structure $Y^t_3$ having the greatest second score is the total of the score for the combination of the chunk "Taro" and its label "the noun phrase (NP)", the score for the combination of the chunk "Yamada" and its label "the noun phrase (NP)" and the score for the combination of the chunk "signs" and its label "the verb phrase (VP)". The first score set in the first record that represents the cue, which is identical to the combination of the chunk "Taro" and its label "the noun phrase (NP)", in the structure prediction model illustrated in FIG. 18, is used for the calculation of the score for that combination. In other words, "0" is obtained. The first score set in the second record that represents the cue, which is identical to the combination of the chunk "Yamada" and its label "the noun phrase (NP)", in the structure prediction model illustrated in FIG. 18, is used for the calculation of the score for that combination. In other words, "0" is obtained. The first score set in the fifth record that represents the cue, which is identical to the combination of the chunk "signs" and its label "the verb phrase (VP)", in the structure prediction model illustrated in FIG. 18, is used for the calculation of the score for that combination. In other words, "⅓" is obtained. Therefore, the maximum score $s_1$ ($X_3$, $Y^t_3$) for the structure $Y^t_3$ 2101 having the greatest second score is "⅓".

Furthermore, the correct score that is the second score of the correct structure $Y_3$ 1707 is also calculated. The second score $s_1$ ($X_3$, $Y_3$) for the correct structure $Y_3$ 1707 is the total of a score for the combination of the first chunk "Taro Yamada" and its label of the "nounphrase (NP)" and a score for the combination of the second chunk "signs" and its label "the verb phrase (VP)". The first score set in the seventh record that represents the cue, which is identical to the combination of the first chunk "Taro Yamada" and its label "the noun phrase (NP)", in the structure prediction model illustrated in FIG. 18, is used for the calculation of the score for that combination. In other words, "⅓" is obtained. The first score set in the fifth record that represents the cue, which is identical to the combination for the second chunk "signs" and its label "the verb phrase (VP)", in the structure prediction model illustrated in FIG. 18, is used for the calculation of the score for that combination. In other words, "⅓" is obtained. Therefore, the correct score $s_1$ ($X_3$, $Y_3$) that is the second score of the correct structure $Y_3$ 1707 is "⅔".

Therefore, as for the third training sample $X_3$, the difference between the correct score and the maximum score is "⅓".

Based on these differences, the confidence degree that satisfies an expression (4) described later is identified. In this example, according to an expression (5) described later, $\alpha_1$ is found based on a following calculation:

$Z^-_1(\alpha_1)$(Note that "~" means a hat on Z.)=⅓exp(−$\alpha$*(0))+⅓exp(−$\alpha$*(⅓))+⅓exp(−$\alpha$*(⅓))=
⅓+⅔exp(−$\alpha$/3)<1

In this example, 0<the confidence degree $\alpha_1$ is sufficient, therefore, "1" is set as the confidence degree $\alpha_1$.
Therefore, a following value is obtained.

$Z^-_1(1)$=0.81102

Then, according to an expression (6) described later, the weights of the training samples are calculated as follows:

$$W_{2,1} = W_{1,1}\exp(-(0))/Z^-_1(1)$$
$$= (1/3)/Z^-_1(1)$$
$$= 0.411$$

-continued $$W_{2,2} = W_{1,2}\exp(-(1/3))/Z^-_1(1)$$
$$= (1/3)\exp(-(1/3))/Z^-_1(1)$$
$$= 0.29449$$

$$W_{2,3} = W_{1,3}\exp(-(1/3))/Z^-_1(1)$$
$$= (1/3)\exp(-(1/3))/Z^-_1(1)$$
$$= 0.29449$$

FIG. 22 illustrates an example of the updated weights of the training samples. Thus, after updating the weights of the training samples, the structured learning is further repeated.

Figure 23:
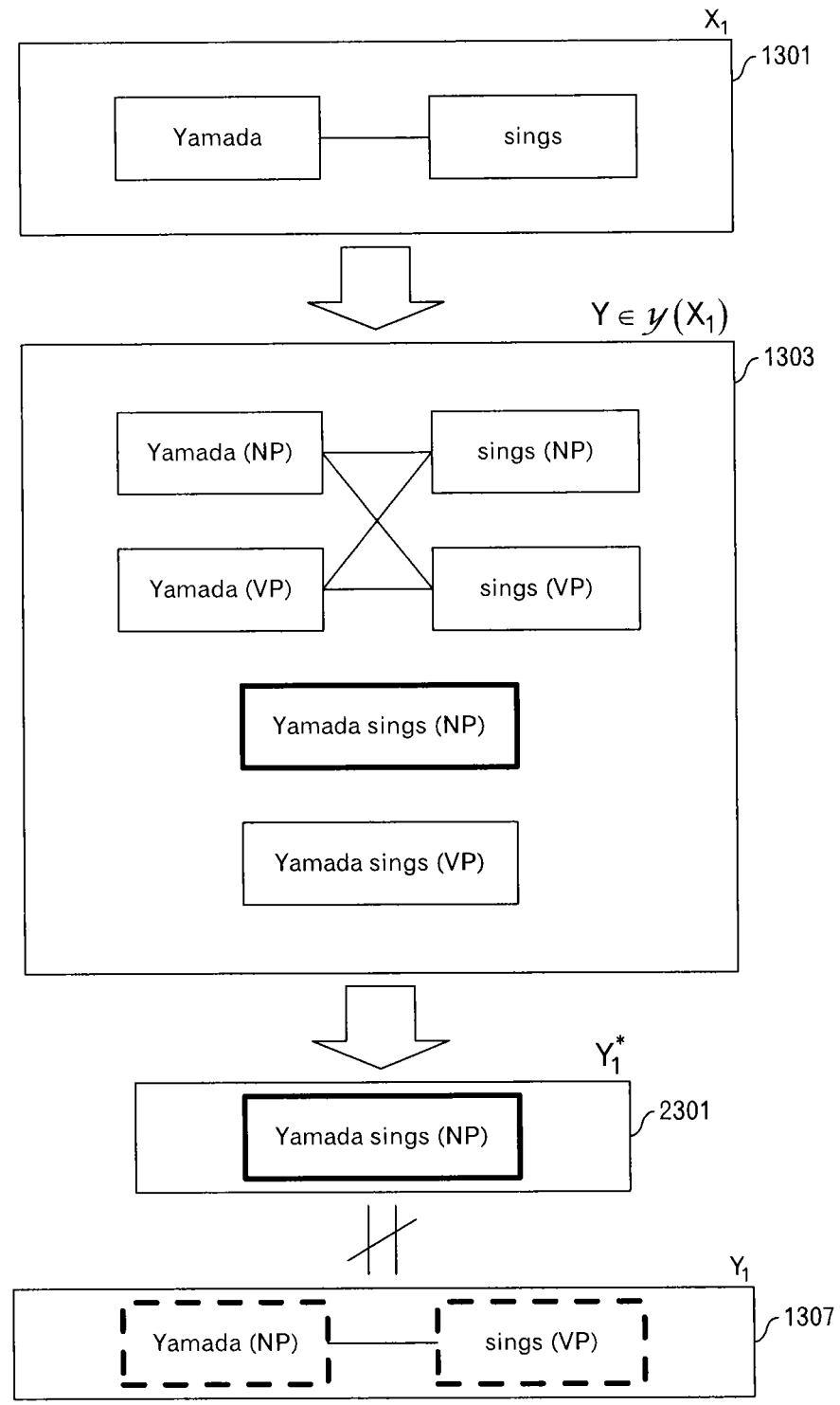
FIG. 23 is a diagram depicting a state of the structured learning.

FIG. 23 illustrates a state of the second structured learning for the first training sample. In the second structured learning, the structure prediction model is initialized, and its state returns to the state illustrated in FIG. 12. FIG. 23 illustrates a state that the structure $Y^*_1$ 2301 having the greatest second score is extracted from the candidate structures $Y$ 1303 for the word sequence 1301 of the first training sample $X_1$, according to the structure prediction model illustrated in FIG. 12. Here, a combination of the chunk "Yamada signs" and its label "the noun phrase (NP)" is selected.

Because the correct structure $Y_1$ 1307 of the first training sample $X_1$ corresponds to columns for a combination of the first chunk "Yamada" and its label "the noun phrase (NP)" and a combination of the second chunk "signs" and its label "the verb phrase (VP)", it is determined that the maximum-score structure $Y^*_1$ 2301, which is extracted here, is not identical to the correct structure $Y_1$ 1307.

Also in FIG. 23, the combination of the chunk and its label, which are included in the maximum-score structure $Y^*_1$ 2301, is surrounded by a thick solid line, and the combination of the chunk and its label, which are included in the correct structure $Y_1$ 1307, is surrounded by a thick dotted line.

FIG. 24 illustrates a state that the structure prediction model is updated based on the determination result illustrated in FIG. 23. Because a combination of the chunk "Yamada signs" and its label "the noun phrase (NP)", which are included in the maximum-score structure $Y^*_1$ 2301, is identical to the cue of the sixth record in the structure prediction model, the weight is subtracted from the first score of the sixth record. At this time, "0.411" that corresponds to the weight $W_{2,1}$ of the first training sample illustrated in FIG. 22 is subtracted. Compared with the weight of the first time, the weight is increased.

Furthermore, because the combination of the first chunk "Yamada" and its label "the noun phrase (NP)", which are included in the correct structure $Y_1$ 1307, is identical to the cue of the second record in the structure prediction model, the weight is added to the first score of the second record. Similarly, because the combination of the second chunk "signs" and its label "the verb phrase (VP)", which are included in the correct structure $Y_1$ 1307, is identical to the cue of the fifth record in the structure prediction model, the weight is added to the first score of the fifth record. At this time, as for both cases, "0.411" that corresponds to the weight $W_{2,1}$ of the first training sample illustrated in FIG. 22 is added. Compared with the value at the first time, the weight is Increased. As described above, the second structured learning is finished for the first training sample.

Figure 25:
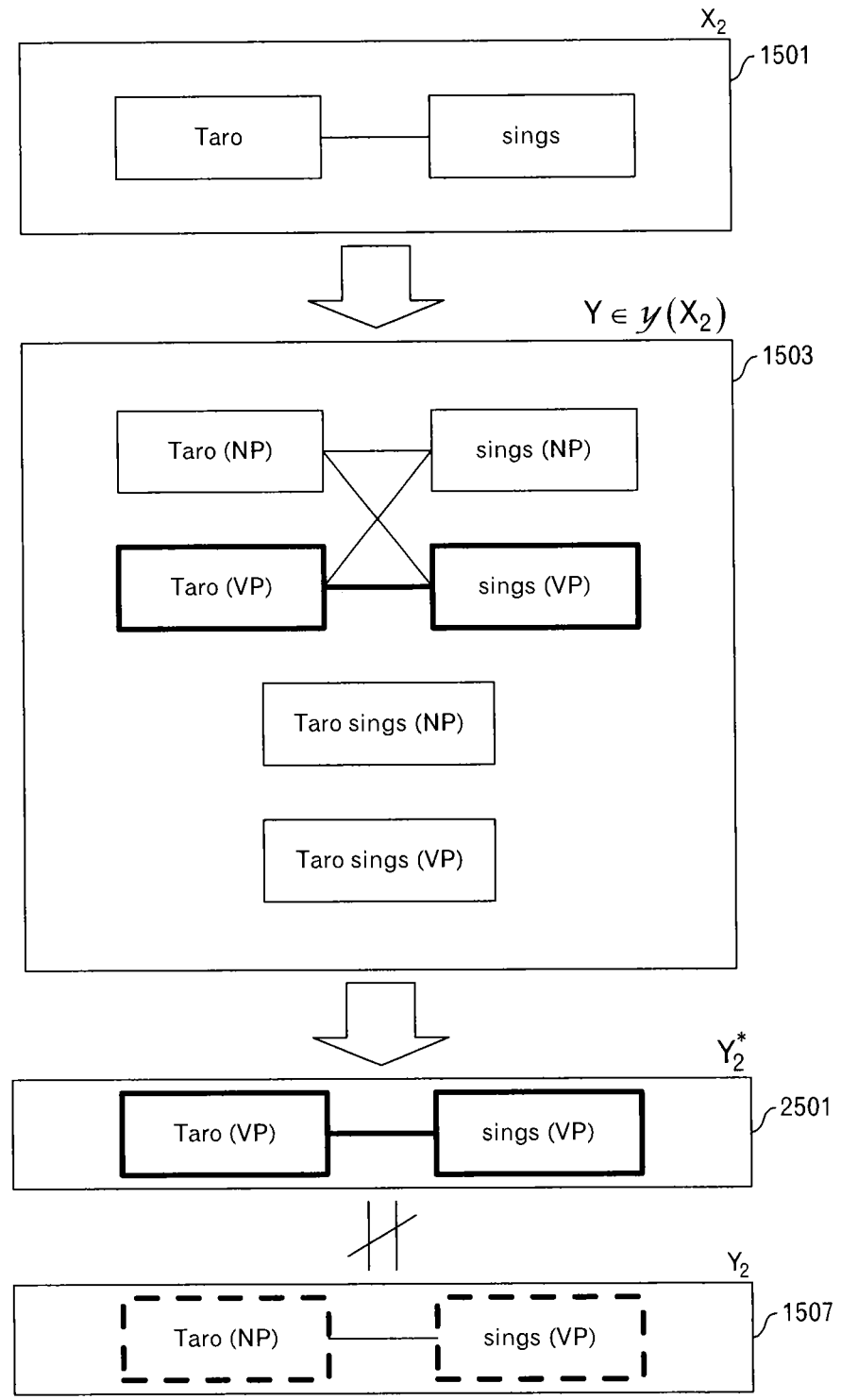
FIG. 25 is a diagram depicting a state of the structured learning.

Next, FIG. 25 illustrates a state of the second structured learning for the second training sample. FIG. 25 illustrates a state that the structure $Y^*_2$ 2501 having the greatest second score is extracted from the candidate structures $Y$ 1503 for the word sequence 1501 of the second training sample $X_2$, according to the structure prediction model illustrated in FIG. 24. Here, columns for a combination of the chunk "Taro" and its label "the verb phrase (VP)" and a combination of the chunk "signs" and its label "the verb phrase (VP)" are selected.

Because the correct structure $Y_2$ 1507 of the second training sample $X_2$ corresponds to columns for the combination of the first chunk "Taro" and its label "the noun phrase (NP)" and the combination of the second chunk "signs" and its label "the verb phrase (VP)", it is determined that the maximum-score structure $Y^*_2$ 2501, which is extracted here, is not identical to the correct structure $Y_2$ 1507.

Also in FIG. 25, the combination of the chunk and its label, which are included in the maximum score structure $Y^*_2$ 2501, is surrounded by a thick solid line, and the combination of the chunk and its label, which are included in the correct structure $Y_2$ 1507, is surrounded by a thick dotted line.

FIG. 26 illustrates a state that the structure prediction model is updated based on the determination result illustrated in FIG. 25. Because the combination of the chunk "Taro" and its label "the verb phrase (VP)", which are included in the maximum-score structure $Y^*_2$ 2501, is identical to the cue of the third record in the structure prediction model, the weight is subtracted from the first score of the third record. Similarly, because the combination of the chunk "signs" and its label "the verb phrase (VP)", which are included in the maximum-score structure $Y^*_2$ 2501, is identical to the cue of the fifth record in the structure prediction model, the weight is subtracted from the first score of the fifth record. At this time, as for each case, "0.29449" is subtracted, which corresponds to the weight $W_{2,2}$ of the second training sample illustrated in FIG. 22. Compared with the value at the first time, the weight is decreased.

Furthermore, because the combination of the first chunk "Taro" and its label "the noun phrase (NP)", which are included in the correct structure $Y_2$ 1507, is identical to the cue of the first record in the structure prediction model, the weight is added to the first score of the first record. Similarly, because the combination of the second chunk "signs" and its label "the verb phrase (VP)", which are included in the correct structure $Y_2$ 1507, is identical to the cue of the fifth record in the structure prediction model, the weight is added to the first score of the fifth record. At this time, as for each case, "0.29449" is added, which corresponds to the weight $W_{2,2}$ of the second training sample illustrated in FIG. 22. Compared with the value of the first time, the weight is decreased. As for the first score of the fifth record, both of the subtraction and addition are applied, therefore, as a result, the value does not change. As described above, the second structured learning for the second training sample is finished.

Figure 27:
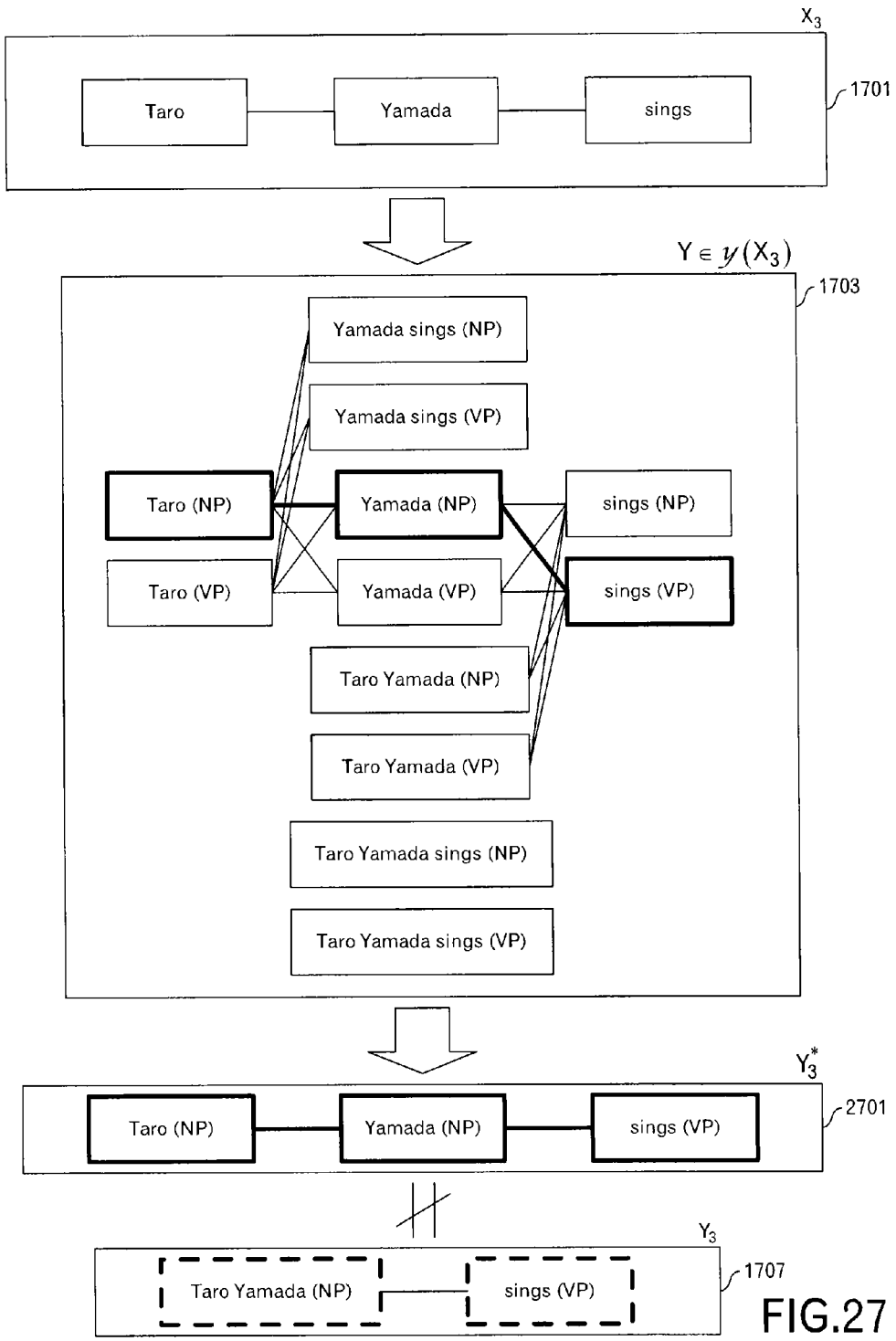
FIG. 27 is a diagram depicting a state of the structured learning.

Next, FIG. 27 illustrates a state of the second structured learning for the third training sample. FIG. 27 illustrates a state that the structure $Y^*_3$ 2701 having the greatest second score is extracted from the candidate structures Y 1703 for the word sequence 1701 of the third training sample $X_3$ according to the structure prediction model illustrated in FIG. 26. Here, columns for a combination of the chunk "Taro" and its label "the noun phrase (NP)" and a combination of the chunk "Yamada" and its label "the noun phrase (NP)" and a combination of the chunk "sings" and its label "the verb phrase (VP)" are selected.

Because the correct structure $Y_3$ 1707 of the third training sample $X_3$ corresponds to columns for a combination of the first chunk "Taro Yamada" and its label "the noun phrase (NP)" and a combination of the second chunk "signs" and its label "the verb phrase (VP)", it is determined that the maximum-score structure $Y^*_3$ 2701, which was extracted here, is not identical to the correct structure $Y_3$ 1707.

Also in FIG. 27, the combination of the chunk and its label, which are included in the maximum-score structure $Y^*_3$ 2701, is surrounded by a thick solid line, and the combination of the chunk and its label, which are included in the correct structure $Y_3$ 1707, is surrounded by a thick dotted line.

Figure 28:
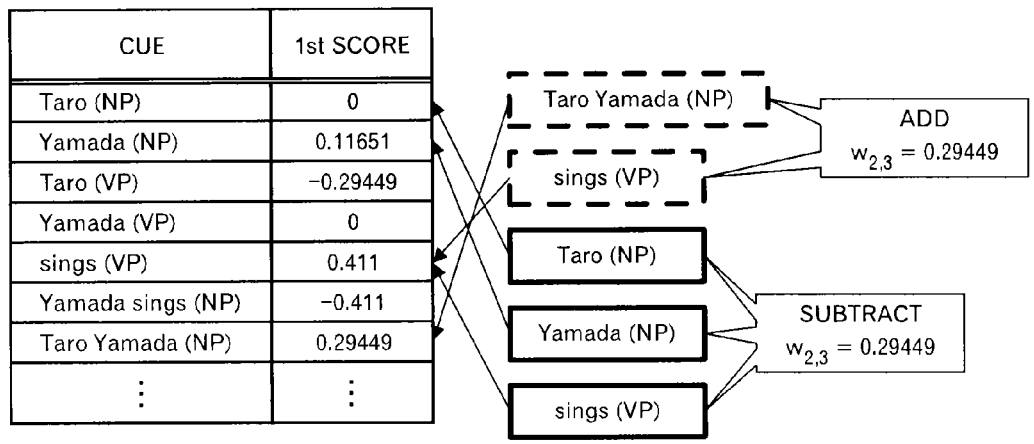
FIG. 28 is a diagram depicting a state of updating the structure prediction model.

FIG. 28 illustrates a state that the structure prediction model is updated based on the determination result illustrated in FIG. 27. Because the combination of the chunk "Taro" and its label "the noun phrase (NP)", which are included in the maximum-score structure $Y^*_3$ 2701, is identical to the cue of the first record in the structure prediction model, the weight is subtracted from the first score of the first record. Similarly, because the combination of the chunk "Yamada" and its label "the noun phrase (NP)", which are included in the maximum-score structure $Y^*_3$ 2701, is identical to the cue of the second record in the structure prediction model, the weight is subtracted from the first score of the second record. Similarly, because the combination of the chunk "signs" and its label "the verb phrase (VP)", which are included in the maximum-score structure $Y^*_3$ 2701, is identical to the cue of the fifth record in the structure prediction model, the weight is subtracted from the first score of the fifth record. At this time, as for each case, "0.29449" that corresponds to the weight $W_{2,3}$ of the third training sample illustrated in FIG. 22 is subtracted. Compared with the value at the first time, the weight is decreased.

Furthermore, because the combination of the first chunk "Taro Yamada" and its label "the noun phrase (NP)", which are included in the correct structure $Y_3$ 1707, is identical to the cue of the seventh record in the structure prediction model, the weight is added to the first score of the seventh record. Similarly, because the combination of the second chunk "signs" and its label "the verb phrase (VP)", which are included in the correct structure $Y_3$ 1707, is identical to the cue of the fifth record in the structure prediction model, the weight is added to the first score of the fifth record. At this time, for each case, "0.29449" that corresponds to the weight $W_{2,3}$ of the third training sample illustrated in FIG. 22 is added. Compared with the value at the first time, the weight is decreased. As for the first score of the fifth record, both of the subtraction and addition is performed, therefore, as a result, the value of the first score does not change. As described above, the second structured learning for the third training sample is finished.

Then, the confidence degree is also calculated for the second structure prediction model. The structure prediction accuracy of the second structure prediction model illustrated in FIG. 28 is improved compared with that of the first structure prediction model illustrated in FIG. 18.

For example, the first score "0" of the first record that corresponds to the cue that is identical to the combination of the chunk "Taro" and its label "the noun phrase (NP)" is greater than the first score "−0.29449" of the third record that corresponds to the cue that is identical to the combination of the chunk "Taro" and its label "the verb phrase (VP)". Therefore, as for the chunk "Taro", the correct label "the noun phrase (NP)" is derived.

For example, the first score "0.11651" of the second record that corresponds to the cue, which is identical to the combination of the chunk "Yamada" and its label. "the noun phrase (NP)", is greater than the first score "0" of the fourth record that corresponds to the cue, which is identical to the combination of the chunk "Yamada" and its label "the verb phrase (VP)". Therefore, as for the chunk "Yamada", the correct label "the noun phrase (NP)" is derived.

For example, the first score "0.29449" of the seventh record that corresponds to the cue, which is identical to the chunk "Taro Yamada" and its label "the noun phrase (NP)", is greater than the total value "0.11651" of the first score "0" of the first record that corresponds to the cue, which is identical to the combination of the chunk "Taro" and its label "the noun phrase (NP)", and the first score "0.11651" of the second record that corresponds to the cue, which is identical to the combination of the chunk "Yamada" and its label. "the noun phrase (NP)". Therefore, the combination of the chunk "Taro Yamada" and its label "the noun phrase (NP)" is correctly derived.

As described later, a combined model is computed based on the respective structure prediction models.

Figure 29:
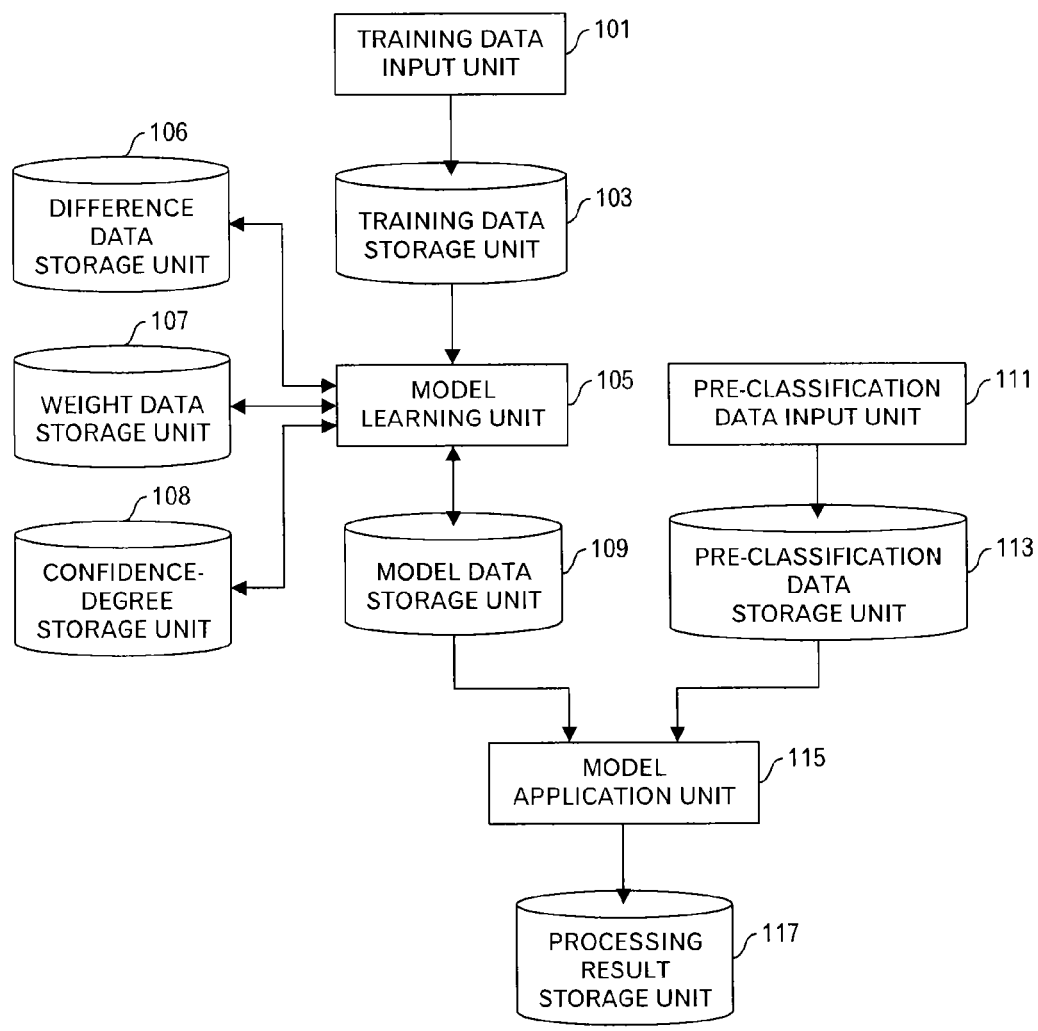
FIG. 29 is a diagram depicting a function block diagram of a model learning apparatus.

Next, the configuration and operation of the specific system will be explained. FIG. 29 illustrates a functional block configuration of a model learning apparatus. The model learning apparatus includes a training data input unit 101 to input the training data and the like, a training data storage unit 103 that stores the training data and the like, which are inputted by the training data input unit 101, and a model learning unit 105 that performs a main processing in this embodiment by using the data stored in the training data storage unit 103.

Furthermore, the model learning apparatus further includes a difference data storage unit 106 that stores difference data of the second scores, which are calculated by the model learning unit 105, a weight data storage unit 107 that stores weight data calculated by the model learning unit 105, a confidence-degree storage unit 108 that stores data of the confidence degrees calculated by the model learning unit 105, and a model data storage unit 109 that stores model data (e.g. structure prediction model and combined model), which is a processing result of the model learning unit 105.

Furthermore, the model learning apparatus further includes a pre-classification data input unit 111 to input pre-classification data that is data to be classified by applying the generated model, a pre-classification data storage unit 113 that stores the pre-classification data inputted by the pre-classification data input unit 111, a model application unit 115 that performs classification by applying the model data stored in the model data storage unit 109 to data to be processed, which is stored in the pre-classification data storage unit 113, and a processing result storage unit 117 that stores the processing results of the model application unit 115.

Figure 30:
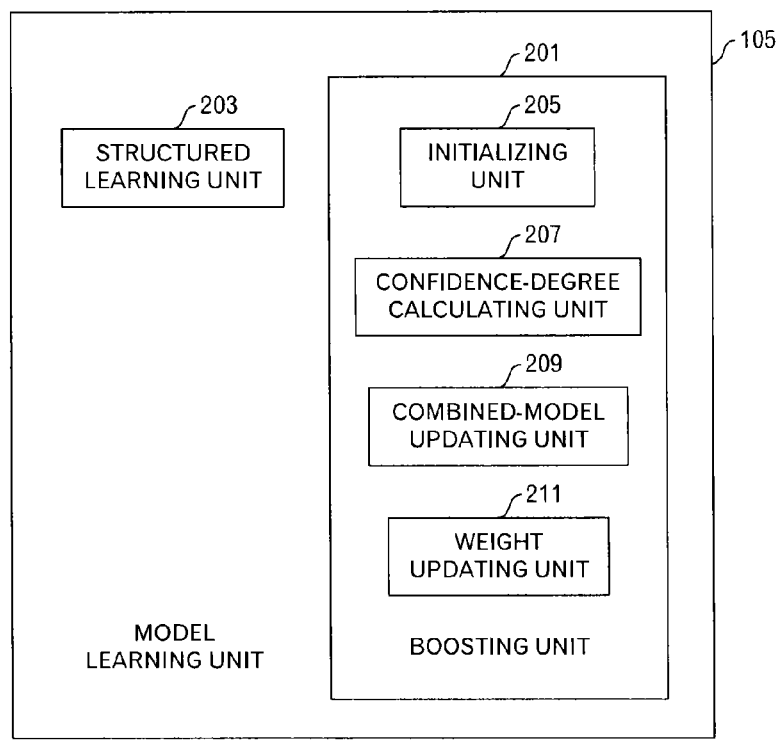
FIG. 30 is a diagram depicting a configuration of a model learning unit.

FIG. 30 illustrates the configuration of the model learning unit 105. The model learning unit 105 has a boosting unit 201 and a structured learning unit 203. The boosting unit 201 performs a boosting processing. The structured learning unit 203 performs a structured learning processing.

The boosting unit 201 has an initializing unit 205, a confidence-degree calculating unit 207, combined-model updating unit 209 and a weight updating unit 211. The initializing unit 205 performs initialization of data. The confidence-degree calculating unit 207 calculates the confidence degree for the structure prediction model. The combined-model updating unit 209 updates the combined model. The weight updating unit 211 updates the weights of the training samples.

Figure 36:
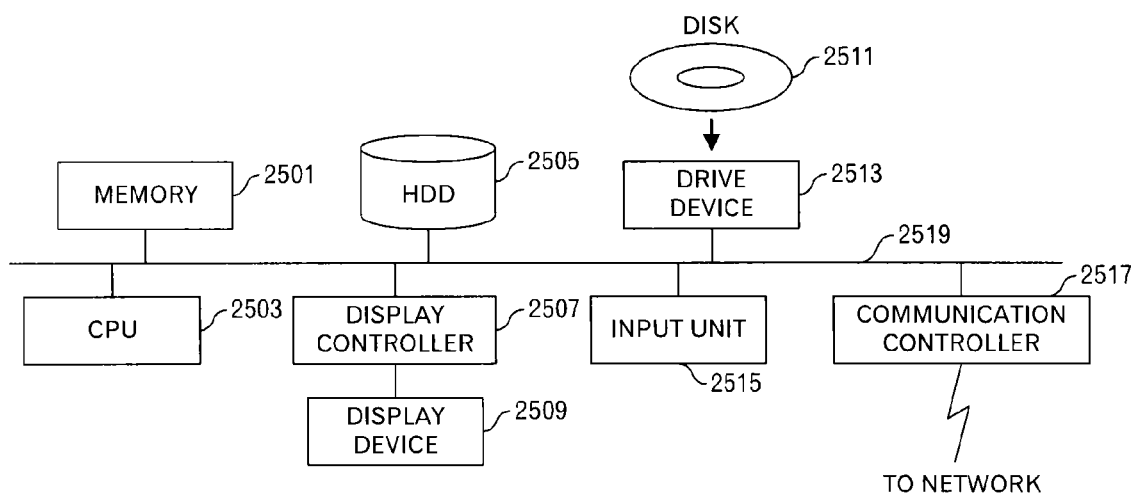
FIG. 36 is a functional block diagram of a computer.

The training data storage unit 103, difference data storage unit 106, weight data storage unit 107, confidence-degree storage unit 108, model data storage unit 109, pre-classification data storage unit 113 and processing result storage unit 117 are realized by a memory 2501, Hard Disk Drive (HDD) 2505 and/or a drive device 2513, which are illustrated in FIG. 36, for example, and will be explained later.

The training data input unit 101, model learning unit 105, pre-classification data input unit 111, model application unit 115, boosting unit 201, structured learning unit 203, initializing unit 205, confidence-degree calculating unit 207, combined-model updating unit 209 and weight updating unit 211 may be realized by executing, by a Central Processing Unit (CPU) 2503, programs stored in the memory 2501. The CPU 2503 and memory 2051 will be explained later by using FIG. 36.

Next, processing contents of the model learning apparatus in this embodiment will be explained by using FIGS. 31 to 35.

Figure 31:
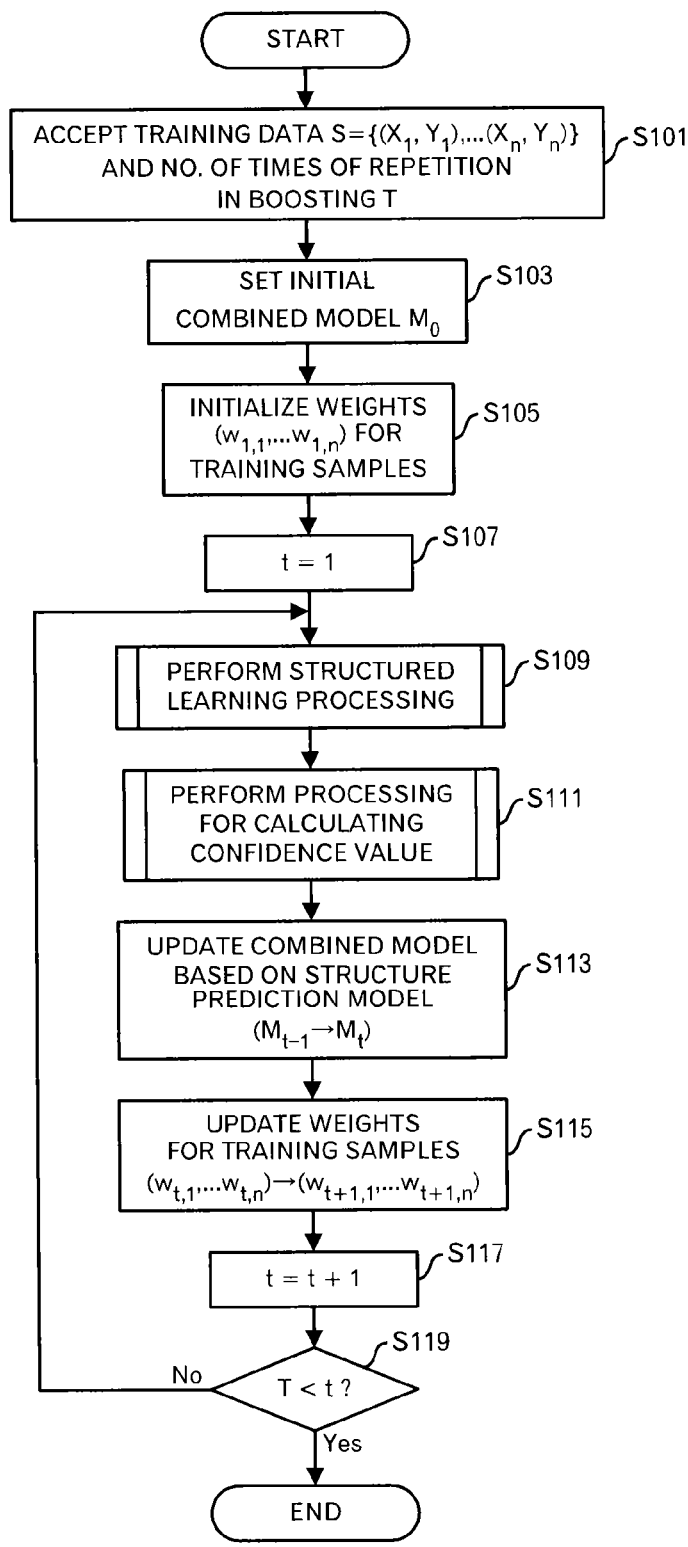
FIG. 31 is a diagram depicting a main processing flow of this embodiment.

FIG. 31 illustrates a main processing flow of this embodiment. Firstly, the training data input unit 101 accepts inputs of the training data $S=\{(X_1, Y_1), \ldots, (X_n, Y_n)\}$ and the number of times T of the repetition in the boosting (S101) from the user, for example.

The training data input unit 101 accepts the training sample that was illustrated, for example, in FIG. 9, and the correct structure illustrated, for example, in FIG. 10.

The model learning unit 105 sets an initial combined model $M_0$ into the model data storage unit 109 (S103). Specifically, the initializing unit 205 of the boosting unit 201 performs this processing. FIG. 32 illustrates an example of a combined model in the initial state. The initializing unit 205 sets "0" as the first score for each cue.

The model learning unit 105 initializes the weights $(w_{1,1}, \ldots, w_{1,n})$ of the training samples, which are stored in the weight data storage unit 107 (S105). Specifically, the initializing unit 205 of the boosting unit 201 performs this processing. 1/n is equally set as each weight.

The boosting unit 201 of the model learning unit 105 initializes a parameter t to "1" (S107).

The structured learning unit 203 of the model learning unit 105 performs the structured learning processing (S109).

Figure 33:
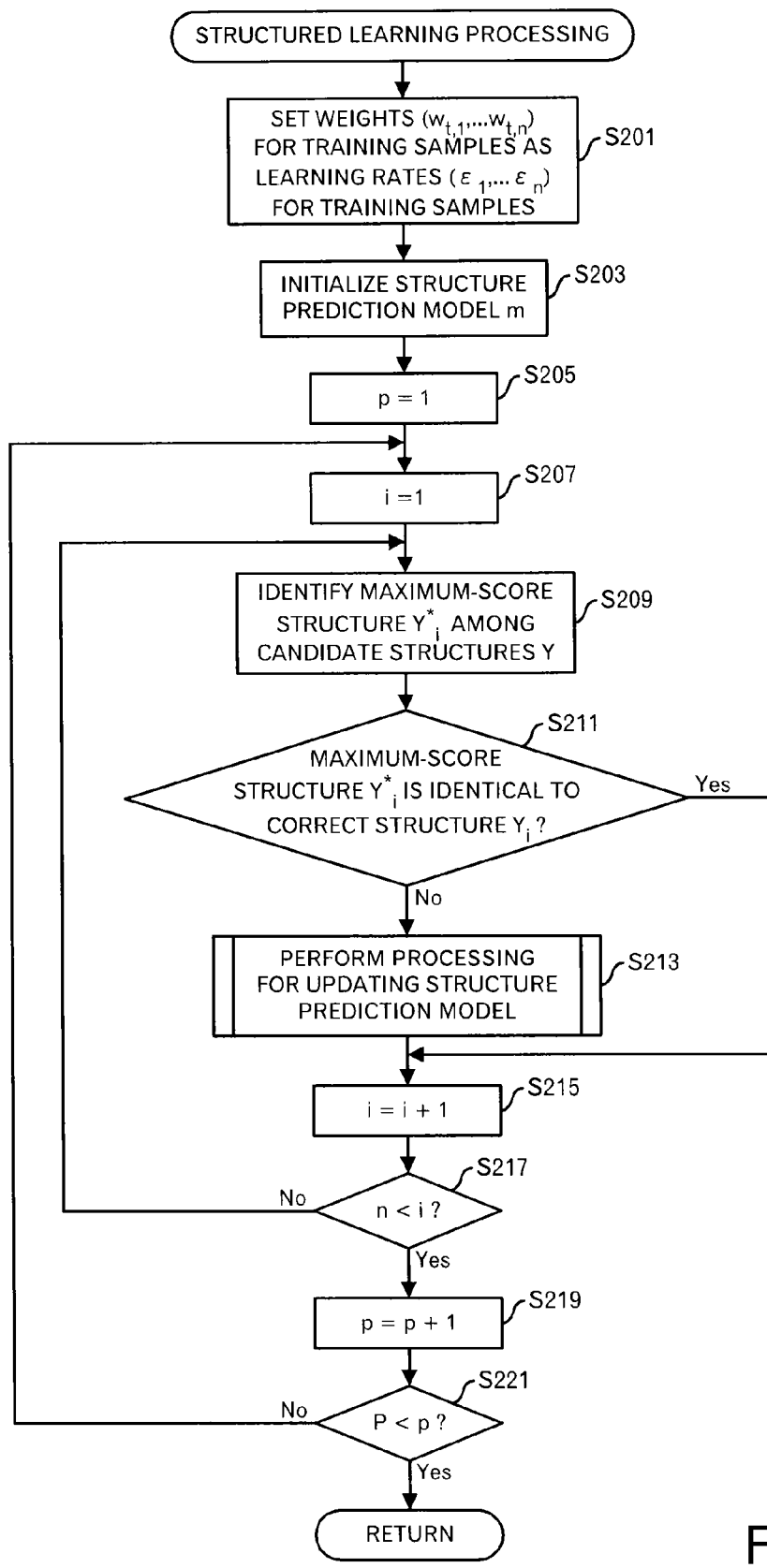
FIG. 33 is a diagram depicting a flow of a structured learning processing.

FIG. 33 illustrates a flow of the structured learning processing. The structured learning unit 203 sets the weights $(w_{t,1}, \ldots, w_{t,n})$ of the training samples as the learning rates $(\epsilon_1, \ldots, \epsilon_n)$ of the training samples as expressed below (S201). The learning rates $(\epsilon_1, \ldots, \epsilon_n)$ of the training samples are internal parameters in the structured learning processing.

$$\{\epsilon_i\}_{i=1}^n = \{w_{t,i}\}_{i=1}^n$$

A case where the method is used, which is described in Cohen, W. W. and Sarawagi, S., "Exploiting dictionaries in named entity extraction: combining semi-Markov extraction processes and data integration methods", Proc. of KDD' 04 pp. 89-98 (2004), is described as an example, however, even when the method is used, which is described in Sarawagi, S. and Cohen, W. W., "Semi-Markov Conditional Random Fields for Information Extraction", Q, Proc. of NIPS' 04 (2004), the learning rates of the training samples may be set as the weights of the training samples, similarly.

The structured learning unit 203 initializes the structure prediction model m, which is stored in the model data storage unit 109 (S203). At this time, the structured learning unit 203 sets "0" as each score, which is included in the structure prediction model m, which is stored in the model data storage unit 109. Thus, the state of the structure prediction model m shifts to a state illustrated in FIG. 12.

The structured learning unit 203 initializes a parameter p to "1" (S205).

The structured learning unit 203 further initializes a parameter i to "1" (S207).

The structured learning unit 203 identifies the structure $Y^*_i$ that has the maximum score from among the candidate structures Y for the training sample $X_i$ according to a following expression (S209). The structure that will be explained later corresponds to columns for the combinations of the chunk and its label, which were explained above, for example.

$$Y_i^* = \underset{Y \in \gamma(X_i)}{\operatorname{argmax}} m \cdot \Phi(X, Y)$$

Φ (X, Y) is a function for mapping the word sequence of the training sample X and the structure Y to a D-dimensional vector, and is defined as follows:

$$\Phi(X, Y) = \sum_{d=1}^{D} \sum_{j=1}^{|Y|} \phi_d(X, Y_{(j)})$$

D is the number of cues in the structure prediction model m. |Y| is the number of chunks included in the structure Y. $Y_{(j)}$ is a combination of the j-th chunk included in the structure Y and its label 1 ($Y_{(j)}$).

Moreover, $\phi_d$ (X, $Y_{(j)}$) is a function that returns the D-dimensional vector for the word sequence X that is the training sample and the combination $Y_{(j)}$. When the word sequence X and the combination $Y_{(j)}$ satisfy a feature that corresponds to d-th cue, a vector in which "1" is set as the d-th element value, and "0" is set as other element values is returned. When the word sequence X and the combination $Y_{(j)}$ do not satisfy the feature that corresponds to d-th cue, a vector in which "0" is set as the d-th element value, and "0" is set as other element values is returned.

As for the feature, for example, "the chunk of $Y_{(j)}$ is "Mr." and its label is "the noun phrase", the word that appears before the forefront word in the chunk of $Y_{(j)}$ is "Mr." and the label of the chunk l ($Y_{(j)}$) is "the verb phrase", or the word that appears after the last word in the chunk of $Y_{(j)}$ is "in", and the label of the chunk l ($Y_{(j)}$) is "the noun phrase" may be used.

By the repetition, the structure prediction model m is updated each time, however, the structured learning unit 203 uses the structure prediction model m at the processing time of S209. w$\phi_d$(X, Y) is a score that is given to the combination of the training sample X and the structure Y.

When the maximum-score structure $Y^*_i$ is different from the correct structure $Y_i$, the structure prediction model m is updated according to a following expression.

$$m = m + \epsilon_i(\Phi(X_i, Y_i) - \Phi(X_i, Y^*_i))$$

Therefore, the structured learning unit 203 determines whether or not the maximum-score structure $Y^*_i$ is identical to the correct structure $Y_i$ (S211). When it is determined that the maximum-score structure $Y^*_i$ is identical to the correct structure $Y_i$, the processing directly shifts to a processing of S215.

On the other hand, when it is determined that the maximum-score structure $Y^*_i$ is not identical to the correct structure $Y_i$, the structured learning unit 203 performs a processing for updating the structure prediction model (S213).

Figure 34:
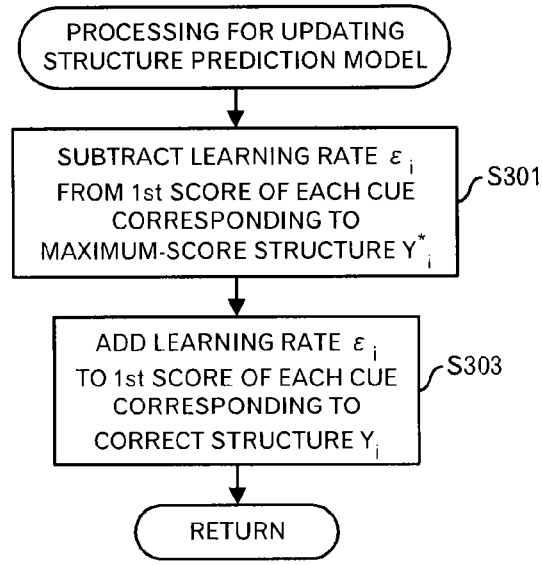
FIG. 34 is a diagram depicting a flow of a processing for updating the structure prediction model.

FIG. 34 illustrates a flow of the processing for updating the structure prediction model. The structured learning unit 203 subtracts the learning rate $\epsilon_i$ from the first score for each cue that corresponds to the maximum-score structure $Y^*_i$ (S301). Like the examples surrounded by the thick solid lines in FIGS. 14, 16, 18, 24, 26 and 28, each cue is identified, which is identical to the combination of each chunk and its label, which are included in the maximum-score structure $Y^*_i$, and the value of the learning rate $\epsilon_i$ is subtracted from the first score of that cue.

Furthermore, the structured learning unit 203 adds the learning rate $\epsilon_i$ to the first score of each cue corresponding to the correct structure $Y_i$ (S303). Like examples surrounded by the thick dotted lines in FIGS. 14, 16, 18, 24, 26 and 28, each cue is identified, which is identical to the combination of each chunk and its label, which are included in the correct structure $Y_i$, and the value of the learning rate $\epsilon_i$ is added to the first score of that cue. Then, the processing returns to the processing of S215 in FIG. 33.

Returning to the processing of FIG. 33, the structured learning unit 203 adds "1" to the parameter i (S215), and determines whether or not the value of the parameter i exceeds the number of training samples n (S217). When it is determined that the value of the parameter i does not exceed the number of training samples n, the processing returns to S209, and the aforementioned processing is repeated. When it is determined that the value of the parameter exceeds the number of training samples n, the processing shifts to S219, and the structured learning unit 203 adds "1" to the parameter p (S219), and determines whether or not the value of the parameter p exceeds the number of times P of the repetition of the structured learning (S221). When it is determined that the value of the parameter p does not exceed the number of times P of the repetition of the structured learning, the processing returns to S207, and the aforementioned processing is repeated. When it is determined that the value of the parameter p exceeds the number of times P of the repetition of the structured learning, the structured learning processing ends, and the processing returns to S111 in FIG. 31.

Returning to the explanation of FIG. 31, the model learning unit 105 performs a processing for calculating the confidence degree (S111). Specifically, the confidence-degree calculation unit 207 of the boosting unit 201 performs this processing.

Figure 35:
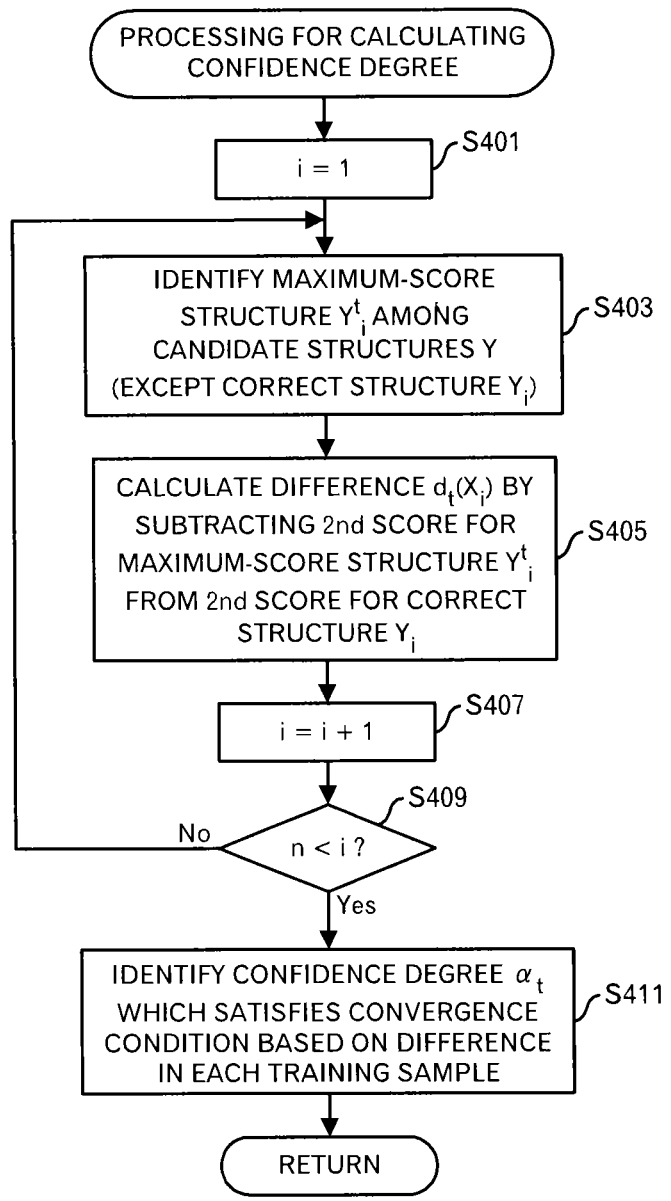
FIG. 35 is a diagram depicting a flow of a processing for calculating a confidence degree.

FIG. 35 illustrates a flow of the processing for calculating the confidence degree. The confidence-degree calculating unit 207 sets "1" to a parameter i (S401). The parameter i is a counter to count the number of times of the repetition of the processing from S403 to S407 to identify the training sample.

The confidence-degree calculating unit 207 identifies the structure $Y'_i$ that obtains the maximum score from among the candidate structures Y except the correct structure $Y_i$ (S403). An expression to identify the structure $Y'_i$ that obtains the maximum score is as follows:

$$Y_i^t = \underset{Y \in \gamma(X_i) \wedge Y \neq Y_i}{\operatorname{argmax}} s_t(X_i, Y)$$

As described in the expression below, the aforementioned $s_t$ ($X_i$, Y) means the score for the structure Y for the training sample $X_i$ in the t-th boosting round.

$$s_t(X, Y) = m_t \cdot \Phi(X, Y)$$

$m_t$ represents the structure prediction model in the t-th boosting round.

As described above, the correct structure $Y_i$ is excluded, therefore, when the score of the correct structure $Y_i$ is maximum among the scores of the candidate structures Y, the structure that obtains the secondarily greatest score is identified as $Y'_i$. At this time, a technique of the forward-DP backward-A* N-best search algorithm may be used (See Nagata, M., "A Stochastic Japanese Morphological Analyzer Using a Forward-DP Backward-A* N-Best Search Algorithm", COLING, pp. 201-207 (1994)).

The confidence-degree calculating unit 207 calculates a difference $d_t$ ($X_i$) by subtracting the second score for the maximum-score structure $Y'_i$ from the second score for the correct structure $Y_i$ according to the following expression (S405). The confidence-degree calculating unit 207 stores the calculated difference into the difference data storage unit 106.

$$d_t(X_i) = s_t(X_i, Y_i) - s_t(X_i, Y'_i)$$

By using this difference, the weight is adjusted so as to increase the weight for an incorrectly chunked training sample or a training sample with an incorrect label.

The confidence-degree calculating unit 207 adds "1" to the parameter i (S407), and determines whether or not the value of the parameter i exceeds the number of training samples n (S409). When it is determined that the value of the parameter i does not exceed the number of training samples n, the processing returns to S403, and the aforementioned processing is repeated.

When it is determined that the value of the parameter i exceeds the number of training samples n, the confidence-degree calculating unit 207 calculates the confidence degree $\alpha_t$ for the combined model $M_t$. Specifically, the confidence-degree calculating unit 207 identifies the confidence degree $\alpha_t$ that satisfies a convergence condition that is represented by a following expression, based on the difference in each training sample, which is stored in the difference data storage unit 106 (S411).

$$\tilde{Z}'_t(\alpha_t) < 1 \qquad (4)$$

At this time, a following expression is used.

$$\tilde{Z}_t(\alpha_t) = \sum_{i=1}^{n} w_{t,i} e^{-\alpha_t d_t(X_i)} \qquad (5)$$

According to this expression, the score that is a real value, which is given to each training sample by the structured learning processing (S109) is handled as an exponent. Therefore, it may be difficult to analytically calculate the confidence degree $\alpha_t$ that satisfies the convergence condition.

As a method for calculating the confidence degree $\alpha_t$, Bisection Search may be used. In order to adjust to the calculation of the confidence degree (AdaBoost: See Schapire, R. E. and Singer, Y., "BoosTexter: A boosting-based system for text categorization", Machine Learning, Vol. 39(2/3), pp. 135-168 (2000)) in case where the weak hypothesis $h_t$ is used, which predicts either of two values {−1, +1}, the weak hypothesis $h_t$ is defined as sign $(d_t(X_i))$ in this embodiment. Then, the value $\alpha_t$ obtained when minimizing $Z_t(\alpha_t)$ in the expression (2) is calculated, and is used as the confidence degree. Therefore, as described in the following expression, the differential by $\alpha_t$ for $Z_t$ is performed.

$$Z'_t(\alpha_t) = \sum_{i=1}^{n} -h_t(X_i) w_{t,i} e^{-\alpha_t h_t(X_i)}$$

Then, by solving the condition that the value of the aforementioned expression becomes "0", the confidence degree as described in the following expression is calculated.

$$\tilde{\alpha}_t = \frac{1}{2} \log \left( \frac{\sum_{i=1}^{n} w_{t,i} [[h_t(X_i) = 1]]}{\sum_{i=1}^{n} w_{t,i} [[h_t(X_i) = 1]]} \right)$$

Finally, the value that minimizes the value of the expression (5) is selected in the following range, and the minimized value is used as the confidence degree.

$$0 \sim 2 \times \tilde{\alpha}_t$$

By broadening the search range as described above, it is expected to obtain much accurate confidence degree. The confidence-degree calculating unit 207 stores the calculated confidence degree into the confidence-degree storage unit 108.

Returning to the explanation of FIG. 31, the model learning unit 105 updates the combined model stored in the model data storage unit 109 based on the structure prediction model stored in the model data storage unit 109 (S113). Specifically, the combined-model updating unit 209 of the boosting unit 201 calculates the combined model $M_t$ at the current boosting round t, based on the combined-model $M_{t-1}$ at the previous boosting round t−1 and the structure prediction model $m_t$ and confidence degree $\alpha_t$, which are computed at the current boosting round t, according to the following expression. At this time, the combined-model updating unit 209 reads out confidence degree $\alpha_t$ from the confidence-degree storage unit 108.

$$M_t = M_{t-1} + \alpha_t m_t$$

Next, the model learning unit 105 updates the weights of the training samples, which are stored in the weight data storage unit 107 (S115). Specifically, the weight updating unit 211 of the boosting unit 201 calculates the weights $(w_{t+1,1}, \ldots, w_{t+1,n})$ of the training samples for the next boosting round t+1 from the weights $(w_{t,1}, \ldots, w_{t,n})$ of the training samples in the current boosting round t according to the following expression.

$$w_{t+1,i} = \frac{w_{t,i} e^{-\alpha_t d_t(X_i)}}{\tilde{Z}_t(\alpha_t)} \qquad (6)$$

When the score $s_t(X_i, Y_i)$ of the correct structure $Y_i$ is greater than the maximum score $s_t(X_i, Y'_i)$, in other words, when $0 < d_t(X_i)$ is satisfied, it means that correct analysis was performed. Therefore, the weight to be used next of the training sample is decreased.

On the other hand, when the score $s_t(X_i, Y_i)$ of the correct structure $Y_i$ is less than the maximum score $s_t(X_i, Y'_i)$, in other words, when $0 > d_t(X_i)$ is satisfied, it means that the correct analysis is not performed. Therefore, the weight to be used next of the training sample is increased.

The boosting unit 201 of the model learning unit 105 increments the value of the parameter t by "1" (S117).

Next, the boosting unit 201 of the model learning unit 105 determines whether or not the value of the parameter t exceeds the number of times of the repetition in the boosting T (S119). When it is determined that the value of the parameter t does not exceed the number of times of the repetition in the boosting T, the processing returns to S109, and the aforementioned processing is repeated. When it is determined that the value of the parameter t exceeds the number of times of the repetition in the boosting T, the processing of FIG. 31 ends.

Finally, a model application processing by the model application unit 115 will be explained. The model application unit 115 performs mapping in the conventional structured learning. The processing of the model application unit 115 is performed similarly to the conventional art by using the model data (in this example, the combined data) stored in the model data storage unit 109 and the data to be classified (in this example, the word sequence), which is inputted by the pre-classification data input unit 111 and is stored in the pre-classification data storage unit 113. In this example, according to the following expression, the structure Y* which has the maximum score calculated based on the final combined model $M_T$ is identified from among the candidate structures Y for the word sequence X that is the pre-classification data.

$$Y^* = \underset{Y \in \gamma(X)}{\mathrm{argmax}}\, M_T \cdot \Phi(X, Y)$$

Then, the processing result (in this example, the structure Y*) is stored in the processing result storage unit 117.

APPENDIX

In the following, it will be explained that the learning method in this embodiment will converge similarly to the case of the premise of the aforementioned embodiment, when $0 < \alpha_t$ is satisfied and the confidence degree $\alpha_t$ that satisfies the expression (4) can be calculated in each boosting round t.

Firstly, it will be proved that the upper bound of the training error described below can be obtained in this learning method in the embodiment.

$$\frac{1}{n}\sum_{i=1}^{n} [[Y_i^* \neq Y_i]] \leq \prod_{t=1}^{T} \tilde{Z}_t(\alpha_t)$$

Note the following expression.

$$Y_i^* = \underset{Y \in \gamma(X_i)}{\mathrm{argmax}}\, M_T \cdot \Phi(X_i, Y)$$

Firstly, by expanding the expression (6), the next expression is obtained.

$$w_{T+1,i} = \frac{w_{T,i} e^{-\alpha_T d_T(X_i)}}{\tilde{Z}_T(\alpha_T)}$$

$$= \frac{e^{-\sum_{t=1}^{T} \alpha_t d_t(X_i)}}{n \prod_{t=1}^{T} \tilde{Z}_t(\alpha_t)}$$

$$= \frac{e^{-\sum_{t=1}^{T} \alpha_t m_t(\Phi(X_i, Y_i) - \Phi(X_i, Y_i^t))}}{n \prod_{t=1}^{T} \tilde{Z}_t(\alpha_t)}$$

Therefore, in case where $Y^*_i$ is not equal to $Y_i$, the following expression is obtained.

$$\frac{e^{-\sum_{t=1}^{T} \alpha_t m_t(\Phi(X_i, Y_i) - \Phi(X_i, Y_i^*))}}{n \prod_{t=1}^{T} \tilde{Z}_t(\alpha_t)} \leq w_{T+1,i}$$

This is because, for t in the range from 1 to T, the following expression is satisfied.

$$m_t \Phi(X_i, Y^*_i) \leq m_t \Phi(X_i, Y^t_i)$$

Furthermore, in case where $Y^*_i$ is not equal to $Y_i$, the following expression is satisfied.

$$1 \leq e^{-\sum_{t=1}^{T} \alpha_t m_t(\Phi(X_i, Y_i) - \Phi(X_i, Y_i^*))} \leq e^{-\sum_{t=1}^{T} \alpha_t m_t(\Phi(X_i, Y_i) - \Phi(X_i, Y_i^t))} = e^{-\sum_{t=1}^{T} \alpha_t d_t(X_i)}$$

Therefore, the following expression is obtained.

$$[[Y_i^* \neq Y_i]] \leq e^{-\sum_{t=1}^{T} \alpha_t d_t(X_i)}$$

The upper bound of the aforementioned training error is obtained as described below from these results.

$$\frac{1}{n}\sum_{i=1}^{n} [[Y_i^* \neq Y_i]] \leq \frac{\sum_{i=1}^{n} e^{-\sum_{t=1}^{T} \alpha_t d_t(X_i)}}{n} =$$

$$\sum_{i=1}^{n}\left(\prod_{t=1}^{T} \tilde{Z}_t(\alpha_t)\right) w_{T+1,i} = \prod_{t=1}^{T} \tilde{Z}_t(\alpha_t)$$

As described above, similarly to the conventional boosting method, this embodiment also has the convergence characteristic.

Although an embodiment of this invention was explained above, this invention is not limited to the embodiment. For example, the aforementioned functional block configuration may not correspond to a program module configuration.

Moreover, the aforementioned configuration of the respective storage units or areas are mere examples, and may be changed. Furthermore, as for the processing flow, as long as the processing results do not change, the turns of the steps may be exchanged and the steps may be executed in parallel.

In addition, the aforementioned model learning apparatus are computer devices as illustrated in FIG. 36. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 36. An operating system (OS) and an application program for carrying out the foregoing processing in the embodiment are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments of this invention are outlined as follows:

A model learning method relating to the embodiments includes: (A) first updating, based on a weight of each training sample, a first score for each of features, which is a cue in case of extracting a correct structure from each training sample, to calculate a model defined by first scores; (B) performing, for each training sample, a processing comprising: identifying a maximum score from among second scores, each of which is assigned, by the model, to either of candidate structures other than the correct structure of the training sample among plural candidate structures that are derived from the training sample; and first calculating a difference between the identified maximum score and a second score that is assigned by the model to the correct structure of the training sample; and (C) second calculating a confidence degree based on an upper limit value of errors, which is defined by the calculated difference of each training sample; (D) second updating, the weight of each training sample based on the confidence degree and the calculated difference of each training sample; and (E) repeating, the first updating, the performing, the second calculating and the second updating.

As a result of the aforementioned processing, by representing the confidence degree of the model obtained by the structured learning by the difference between the second score of the correct structure and the maximum score of other candidate structures, it is possible to update the weight of the training sample used for next structured learning. Furthermore, it is possible to decrease the training error in the structured learning based on the upper bound of the training error. For example, by applying the boosting method based on the weight of the training sample to the structured learning, it is possible to improve the accuracy of the structured learning.

Furthermore, in the first updating, the first score may be updated by setting the weight of each training sample as a learning rate of the training sample.

By the aforementioned processing, it is possible to directly reflect the weight of the training sample to the model derived from the structured learning.

Another model learning method relating to the embodiments includes: (a) first updating a first score for each of features based on a weight of a training sample, each of the features being a cue to extract a correct structure from the training sample, to calculate a model defined by first scores; (b) performing a processing including: (b1) identifying a maximum score from second scores, each of the second scores being assigned, by the model, to either of candidate structures other than the correct structure among plural candidate structures derived from the training sample; and (b2) first calculating a difference between the maximum score and a second score that is assigned, by the model, to the correct structure; and (c) second calculating a confidence degree based on the difference; and (d) second updating the weight of the training sample based on the confidence degree and the difference.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A machine learning method comprising:
   first updating, by using a computer, a first score for a feature based on a weight of training sample, the feature being a cue to extract a correct structure from the training sample corresponding to the weight, to calculate a model defined by the first score;
   performing a process, by using the computer, the process comprising:
      identifying, by using the computer, a maximum score from second scores, each of the second scores is assigned, by the model, to candidate structures other than the correct structure among a plurality of candidate structures derived from the training sample; and
      first calculating, by using the computer a difference between the maximum score and a second score that is assigned, by the model, to the correct structure;
   second calculating, by using the computer, a confidence degree of the model based on an upper limit value of error defined by the difference; and
   second updating, by using the computer, the weight based on the confidence degree and the difference.

2. The machine learning method as set forth in claim 1, further comprising:
   repeating the first updating, the performing, the second calculating and the second updating.

3. The machine learning method as set forth in claim 1, wherein each of a plurality of training samples is processed in the first updating, the performing, the second calculating and the second updating.

4. The machine learning method as set forth in claim 1, wherein, in the first updating, the first score is updated by setting the weight of the training sample as a learning rate of the training sample.

5. A non-transitory computer-readable storage medium storing a program that causes a computer to execute a process comprising:
   first updating a first score for a feature based on a weight of training sample, the feature being a cue to extract a correct structure from the training sample corresponding to the weight, to calculate a model defined by the first score;
   performing a process comprising:
      identifying a maximum score from second scores, each of the second scores is assigned, by the model, to candidate structures other than the correct structure among a plurality of candidate structures derived from the training sample; and
      first calculating a difference between the maximum score and a second score that is assigned, by the model, to the correct structure;
   second calculating a confidence degree of the model based on an upper limit value of error defined by the difference; and second updating the weight based on the confidence degree and the difference.

6. A machine learning apparatus comprising:

a memory; and a processor coupled to the memory and configured to:

first update a first score for a feature based on a weight of training sample, the feature being a cue to extract a correct structure from the training sample corresponding to the weight, to calculate a model defined by the first score;

perform a process comprising:

identify a maximum score from second scores, each of the second scores is assigned, by the model, to candidate structures other than the correct structure among a plurality of candidate structures derived from the training sample; and first calculate a difference between the maximum score and a second score that is assigned, by the model, to the correct structure;

second calculate a confidence degree of the model based on an upper limit value of error defined by the difference; and second update the weight based on the confidence degree and the difference.

7. The non-transitory computer-readable storage medium as set forth in claim 5, wherein the process further comprises:

repeating the first updating, the performing, the second calculating and the second updating.

8. The non-transitory computer-readable storage medium as set forth in claim 5, wherein each of a plurality of training samples is processed in the first updating, the performing, the second calculating and the second updating.

9. The non-transitory computer-readable storage medium as set forth in claim 5, wherein, in the first updating, the first score is updated by setting the weight of the training sample as a learning rate of the training sample.

10. The machine learning apparatus as set forth in claim 6, wherein the processor is further configured to repeat the first updating, the performing, the second calculating and the second updating.

11. The machine learning apparatus as set forth in claim 6, wherein each of a plurality of training samples is processed in the first updating, the performing, the second calculating and the second updating.

12. The machine learning apparatus as set forth in claim 6, wherein, in the first updating, the first score is updated by setting the weight of the training sample as a learning rate of the training sample.

13. The machine learning method as set forth in claim 1, wherein each of a plurality of training samples is processed in the first updating, the performing, the second calculating and the second updating, and the method further comprising:

repeating the first updating, the performing, the second calculating and the second updating, a predetermined number of times; and classifying data whose classification is unknown by using the model.

14. The non-transitory computer-readable storage medium as set forth in claim 5, wherein each of a plurality of training samples is processed in the first updating, the performing, the second calculating and the second updating, and the process further comprising:

repeating the first updating, the performing, the second calculating and the second updating, a predetermined number of times; and classifying data whose classification is unknown by using the model.

15. The machine learning apparatus as set forth in claim 6, wherein each of a plurality of training samples is processed in the first updating, the performing, the second calculating and the second updating, and the processor is further configured to:

repeat the first updating, the performing, the second calculating and the second updating, a predetermined number of times; and classify data whose classification is unknown by using the model.

* * * * *